US012655939B2

(12) United States Patent
Li et al.

(10) Patent No.: US 12,655,939 B2
(45) Date of Patent: Jun. 16, 2026

(54) PRODUCTION CONTROL SYSTEM FOR HYDROGEN STORAGE TANK

(71) Applicant: HEFEI GENERAL MACHINERY RESEARCH INSTITUTE CO., LTD., Hefei (CN)

(72) Inventors: Fanding Li, Hefei (CN); Xuedong Chen, Hefei (CN); Peng Xu, Hefei (CN); Zhichao Fan, Hefei (CN); Jiahui Tao, Hefei (CN)

(73) Assignee: HEFEI GENERAL MACHINERY RESEARCH INSTITUTE CO., LTD., Hefei (CN)

( * ) Notice: Subject to any disclaimer, the term of this patent is extended or adjusted under 35 U.S.C. 154(b) by 70 days.

(21) Appl. No.: 18/954,490

(22) Filed: Nov. 20, 2024

(65) Prior Publication Data

US 2025/0237352 A1 Jul. 24, 2025

(30) Foreign Application Priority Data

Jan. 24, 2024 (CN) ......................... 202410095882.8

(51) Int. Cl.
*F17C 1/16* (2006.01)

(52) U.S. Cl.
CPC ........ *F17C 1/16* (2013.01); *F17C 2201/0104* (2013.01); *F17C 2203/0604* (2013.01);
(Continued)

(58) Field of Classification Search
CPC ................ F17C 1/16; F17C 2201/0104; F17C 2203/0604; F17C 2203/067; F17C 2260/01; G06F 30/23; G06F 30/27; G06N 20/00
See application file for complete search history.

(56) References Cited

U.S. PATENT DOCUMENTS

2011/0309074 A1* 12/2011 Thunhorst ............. B29C 70/025 220/660
2022/0317004 A1 10/2022 Björk et al.

FOREIGN PATENT DOCUMENTS

CN 1563781 A 1/2005
CN 102865454 A 1/2013
(Continued)

OTHER PUBLICATIONS

Yan, Jiale et al., Layered Design and Experimental Verification of 70 MPa Vehicle-Mounted Type IV Hydrogen Storage Cylinder, Journal of Xi'an Jiaotong University, 56(10): 71-80, 2022.
(Continued)

*Primary Examiner* — Daniel McNally
(74) *Attorney, Agent, or Firm* — PORUS IP LLC

(57) ABSTRACT

A production control system for a hydrogen storage tank includes: an operating unit, a design terminal, and a processor. The processor may be communicatively connected to the operating unit and the design terminal, respectively. The design terminal may be configured to operate a finite element simulation command stored in a storage unit. The processor may be configured to obtain the target laying parameter from the design terminal, generate an operation command based on the target laying parameter, send the operation command to the winding mechanism; and determine whether to generate an optimization command. In response to a determination of generating the optimization command, the optimization command may be generating and sent to at least one of the operating unit, the monitoring unit, and the design terminal.

17 Claims, 12 Drawing Sheets

(52) U.S. Cl.
CPC .............................. *F17C 2203/067* (2013.01); *F17C 2209/2163* (2013.01); *F17C 2221/012* (2013.01); *F17C 2260/01* (2013.01)

(56) References Cited

FOREIGN PATENT DOCUMENTS

| | | | | | |
|---|---|---|---|---|---|
| CN | 111931302 | A | | 11/2020 | |
| CN | 113154247 | A | | 7/2021 | |
| CN | 114239157 | A | * | 3/2022 | ............... G06N 3/08 |
| CN | 114896719 | A | | 8/2022 | |
| CN | 115307052 | A | | 11/2022 | |
| CN | 115392078 | A | | 11/2022 | |
| CN | 115847785 | A | | 3/2023 | |
| WO | 2022121203 | A1 | | 6/2022 | |

OTHER PUBLICATIONS

Kang, Kai, Study on Fatigue Resistance of Carbon Fiber Wound Cylinder with Aluminum Liner, Full-text Database of Excellent Master's Dissertations in China (I Series of Engineering Science and Technology), 2023, 16 pages.
Zhang, Guangzhe et al., Autofrettage Analysis and Prediction of Burst Pressure of Carbon Fiber-winding Hydrogen Storage Vessels by FEM, Pressure Vessel, 28(8): 27-34&43, 2011.
Yang, Donglin et al., Study on Parametric Modeling and Finite Element Analysis for Composite Hydrogen Storage Vessel, Journal of Jiamusi University (Natural Science Edition), 37(2): 240-242 &239, 2019.
Wang, Xiaolei et al., Development of Hydrogen Storage Tanks for Fixed Fuel Cells, Guangzhou Chemical Industry, 40(13): 69-71, 2012.
Mao, Xinkai et al., Finite Element Analysis of Cylinder Stent for Modified Fuel Cell Bus, Journal of Qingdao University (E&T), 32(4): 76-80, 2017.
Zheng, Jinyang et al., The State of Art of Lightweight High Pressure Hydrogen Storage Tanks, Acta Energial Solaris Sinica, 25(5): 576-581, 2004.
Wang, Huabi et al., Fiber Thickness Prediction and Strength Analysis of Composite Hydrogen Storage Vessels, Composite Materials Science and Engineering, 5: 5-11, 2020.
Zuo, Qian, Burst Pressure Study and Design Optimization for Filament Wound Composite Pressure Vessels, China Excellent Master's Dissertation Full-text Database Engineering Technology II , 2022, 89 pages.
Wang, Xiulei et al., Advances on Materials Design and Manufacture Technology of Plastic Liner of Type IV Hydrogen Storage Vessel, International Journal of Hydrogen Energy, 8382-8408, 2022.
Li, Fanding et al., Optimal Design of Thin-Layered Composites for Type IV Vessels: Finite Element Analysis Enhanced by ANN, Thin-Walled Structures, 110752: 1-15, 2023.

* cited by examiner

PRODUCTION CONTROL SYSTEM FOR HYDROGEN STORAGE TANK

CROSS-REFERENCE TO RELATED APPLICATION

This application claims priority to Chinese application No. 202410095882.8 filed on Jan. 24, 2024, the entire contents of which are incorporated herein by reference.

TECHNICAL FIELD

The present disclosure relates to a technical field of hydrogen storage tank, and in particular to a production control system for a hydrogen storage tank.

BACKGROUND

A hydrogen energy is a kind of green and clean energy. Due to a flammable and explosive feature of hydrogen, a safe and efficient storage and transportation of hydrogen energy is one of major difficulties in a utilization of the hydrogen energy. A type IV (i.e., plastic liner fully wound) hydrogen storage tank has various of advantages over previous generation of a Type III (i.e., metal liner fully wound) hydrogen storage tank, such as light weight, resistance to hydrogen embrittlement, high hydrogen density, good fatigue resistance, etc. However, a complex structure of the composite material layer of the type IV hydrogen storage tank may also pose mechanical problems, especially under high-pressure and cyclic loading conditions, such as an insufficient strength of a liner material, a calculation complexity of an overall strength of the storage tank, and a leakage risk due to an irrational stress distribution of an opening structure of the hydrogen storage tank, etc.

Therefore, a production control system for a hydrogen storage tank is provided, which contributes to a realization of a lightweight design for the laying of the hydrogen storage tank.

SUMMARY

One or more embodiments of the present disclosure provide a production control system for a hydrogen storage tank. The system may include: an operating unit, a design terminal, and a processor. The processor may be communicatively connected to the operating unit and the design terminal, respectively. The operating unit may include a feeding component and a winding mechanism. The feeding component may be configured to deliver a composite material layer on a production line; and the winding mechanism may be configured to wind the composite material layer around a liner on the production line in accordance with a target laying parameter to form inner and outer walls of the hydrogen storage tank. The design terminal may be configured to operate a finite element simulation command stored in a storage unit. The finite element simulation command may be configured to perform a plurality of rounds of iterations, each of the plurality of rounds of iterations at least includes one finite element simulation. The design terminal may be further configured to obtain the target laying parameter based on a result of the finite element simulation obtained from the plurality of the plurality of rounds of iterations. The each of the plurality of rounds of iteration may include: determining a liner size of the hydrogen storage tank, and determining a laying scheme for the composite material layer based on the liner size; establishing a finite element model of the hydrogen storage tank based on the laying scheme; determining whether a laying strength of the composite material layer is qualified by performing a strength verification on the hydrogen storage tank using the finite element model; in response to a determination that the laying strength of the composite material layer is qualified, determining whether the hydrogen storage tank has a fatigue failure site by performing a fatigue verification on the hydrogen storage tank using the finite element model; in response to a determination that the hydrogen storage tank does not have the fatigue failure site, determining the target laying parameter, based on the laying scheme; in response to a determination that the hydrogen storage tank has the fatigue failure site, performing a modification on the laying scheme corresponding to the fatigue failure site; performing the strength verification and the fatigue verification on a modified laying scheme, and determining whether to continue the modification based on a verification result; and in response to a determination that the verification result satisfies a preset condition, determining the target laying parameter based on the modified laying scheme. The processor may be configured to: obtain the target laying parameter from the design terminal, generate an operation command based on the target laying parameter, and send the operation command to the winding mechanism; and, determine whether to generate an optimization command, and in response to a determination of generating the optimization command, generate the optimization command and send the optimization command to at least one of the operating unit, the monitoring unit, and the design terminal.

BRIEF DESCRIPTION OF THE DRAWINGS

The present disclosure will be further illustrated by way of exemplary embodiments, which are described in detail by means of the accompanying drawings. These embodiments are not limiting, and in these embodiments, the same counting denotes the same structure, wherein.

DETAILED DESCRIPTION

Figure 1:
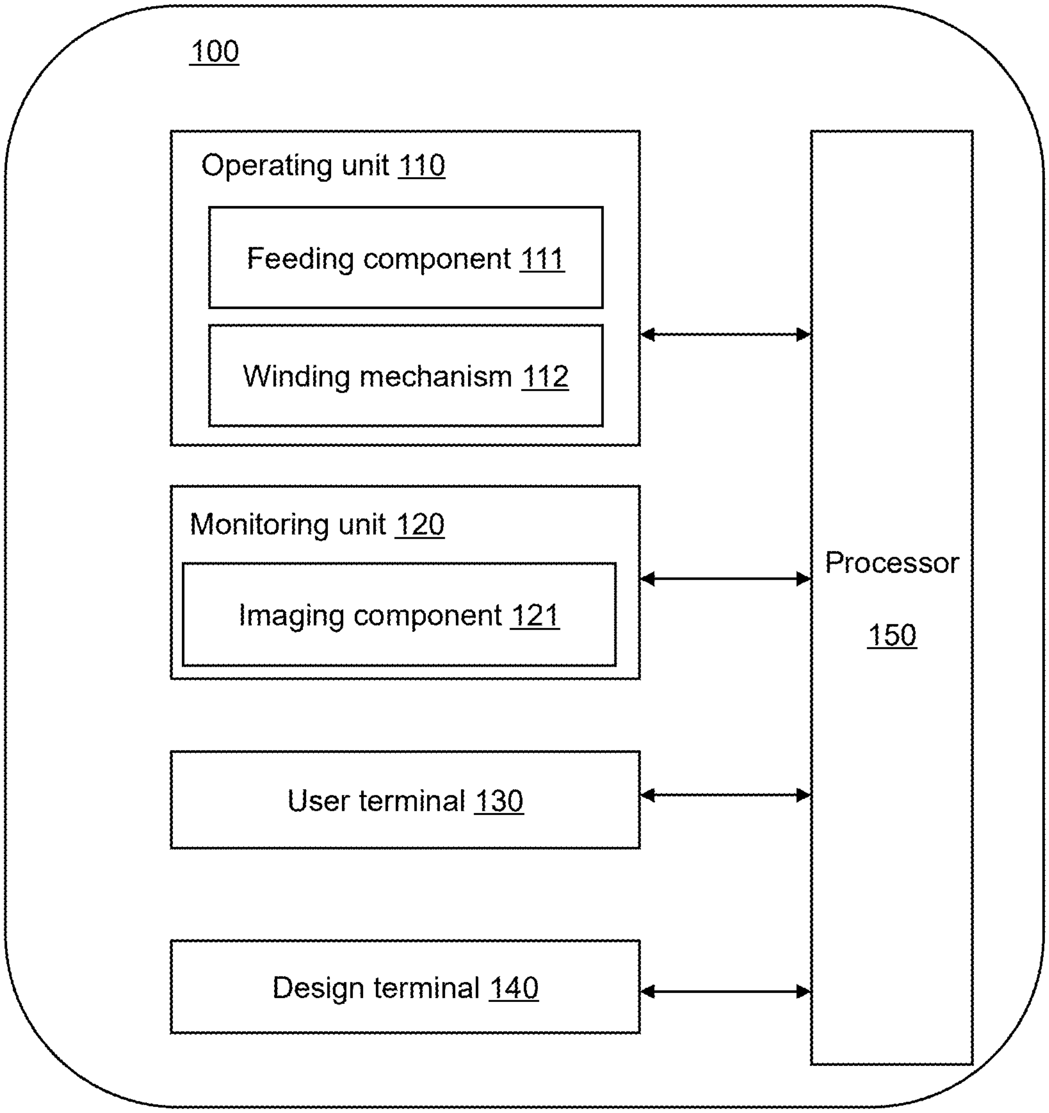
FIG. 1 is a schematic diagram illustrating a structure of a production control system for a hydrogen storage tank according to some embodiments of the present disclosure.

To more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it may be possible for those skilled in the art to apply the present disclosure to other similar scenarios in accordance with these drawings without creative labor. Unless obviously obtained from the context or the context illustrates otherwise, the same numeral in the drawings refers to the same structure or operation.

It may be understood that the terms "system," "device," "unit," and/or "module" as used herein is a way to distinguish between different components, elements, parts, sections or assemblies at different levels. However, the words may be replaced by other expressions if other words accomplish the same purpose.

As of the present disclosure and in the claims, unless the context clearly suggests an exception, the words "a," "one," "an," and/or "the" do not specifically refer to the singular and may include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or apparatus may also include other steps or elements.

Flowcharts are used in the present disclosure to illustrate operations performed by a system according to embodiments of the present disclosure. It may be appreciated that the preceding or following operations are not necessarily performed in an exact sequence. Instead, the steps may be processed in reverse order or simultaneously. Also, it may be possible to add other steps to these processes or remove a step or steps from these processes.

At present, due to a complex composite material layer structure of Type IV (plastic liner fully wound) hydrogen storage tank, a series of mechanical problems may occur. With an increase of an internal pressure of the hydrogen storage tank, an insufficient liner material strength may be insufficient, which leads to a calculation of an overall strength of the hydrogen storage tank may be complex; and under a cyclic loading, a stress distribution of the opening structure of the hydrogen storage tank may be unreasonable, and a leakage may be easily occur.

In order to overcome the above problems, the current research mainly focuses on evaluating a sealing performance of the designed hydrogen storage tank by constructing a test device, verifying the evaluated complexity by actually producing samples of the hydrogen storage tank, and utilizing a calculation method to check the bearing strength of the hydrogen storage tank. However, a cladding of the composite material layer on a surface of a metal valve seat plays a crucial role in the fatigue life of the storage tank, and different laying schemes of the composite material layer may lead to a significant change in a level of stresses that the metal valve seat is exposed to. This manner does not fully consider an influence of mechanical performance of the composite material layer in the design of fatigue performance, which leads to a result that the design often fails to meet expected requirements, and additional tests are needed to verify the results. However, it is difficult to produce carbon fiber materials and a requirement for a winding process device is high, which makes the hydrogen storage tank costly, with long design cycles and a great trial-and-error cost.

In view of the foregoing, some embodiments of the present disclosure provide a production control system for a hydrogen storage tank, which, by means of a finite element model, performs a strength verification and a fatigue verification on the hydrogen storage tank, and optimizes the laying scheme of the composite material layer based on the verification results. The system may further help to improve overall bearing capacity and durability of the hydrogen storage tank, and obtain a design result that meets the expected requirements.

FIG. 1 is a schematic diagram illustrating a structure of a production control system for a hydrogen storage tank according to some embodiments of the present disclosure.

As shown in FIG. 1, a production control system 100 for a hydrogen storage tank (hereinafter referred to as the system 100) may include an operating unit 110, a monitoring unit 120, a user terminal 130, a design terminal 140, and a processor 150.

Some embodiments of the present disclosure may be applied in various fields, such as design and manufacture of high-pressure hydrogen storage tanks, for example, in the field of aerospace, automotive, and shipbuilding, a composite material structure is required to work in extreme environments, and requirements on a laying strength and a fatigue life are high. The design and optimization by the system of the present disclosure may ensure that the composite structure has higher safety and reliability during use.

The operating unit 110 refers to a device and equipment responsible for an actual execution of production tasks (e.g. a feeding, a winding, a fixing, etc.) of the hydrogen storage tank.

In some embodiments, the operating unit 110 may include a feeding component 111, a winding mechanism 112, etc.

The hydrogen storage tank may be a high-pressure container specifically designed to store and transport hydrogen. For example, the hydrogen storage tank may include a type IV (plastic liner fully wound) hydrogen storage tank.

The feeding component 111 refers to a device that delivers a composite material layer in a production line. For example, the feeding component 111 may include an automatic feeder, a transportation belt, a lifting device, etc. The production line refers to a collection of automated or semi-automated production devices for manufacturing the hydrogen storage tanks (e.g., the type IV hydrogen storage tanks).

In some embodiments, the feeding component 111 may also include a storage system for pre-impregnated or unimpregnated reinforcing materials (i.e., the composite material). The reinforcing materials may include a carbon fiber composite tape or a fabric roll. The storage system may also include a spool for winding and storing the reinforcing materials.

In some embodiments, the feeding component 111 may also include a feed drive system configured to take the composite material layer from the storage system and transport it to the winding mechanism 112 on the production line. For example, the feed drive system may include a transportation belt, a roller, or other forms of transportation mechanisms for controlling a speed, a tension, and a position of the composite material fed to the winding mechanism 112.

In some embodiments, the processor 150 may be communicatively connected to the feeding component 111 to control the feed drive system to feed the composite material layer at the same speed as a winding speed of the winding mechanism 112, so that movements of the feed drive system and the winding mechanism 112 may be synchronized.

The winding mechanism 112 may be configured to wind the composite material layer on a liner in accordance with a preset laying parameter on the production line to form inner and outer walls of the hydrogen storage tank. The inner and outer walls of the hydrogen storage tank refer to two or more layers of composite material layers for wrapping the liner structure. For example, the winding mechanism 112 may include a fully automated carbon fiber winding machine, a three-dimensional winding machine, etc.

In some embodiments, the winding mechanism 112 may further include a winding head mounted on the winding mechanism 112. The winding head may flexibly rotate and move along a surface of the liner.

In some embodiments, the winding mechanism 112 may further include a winding drive device configured to control the winding speed and a winding direction. For example, the winding drive device may include a servo motor, a stepper motor, etc. The winding drive device may automatically adjust the winding speed of the composite material according to a set target winding speed distribution.

In some embodiments, the winding mechanism 112 may further include a tension control device configured to monitor and control the tension of the composite material in real time during the winding process. For example, the tension control device may include a brake, a winding device, etc. The tension control device may automatically adjust the winding tension of the composite material based on a set target winding tension distribution.

Figure 3:
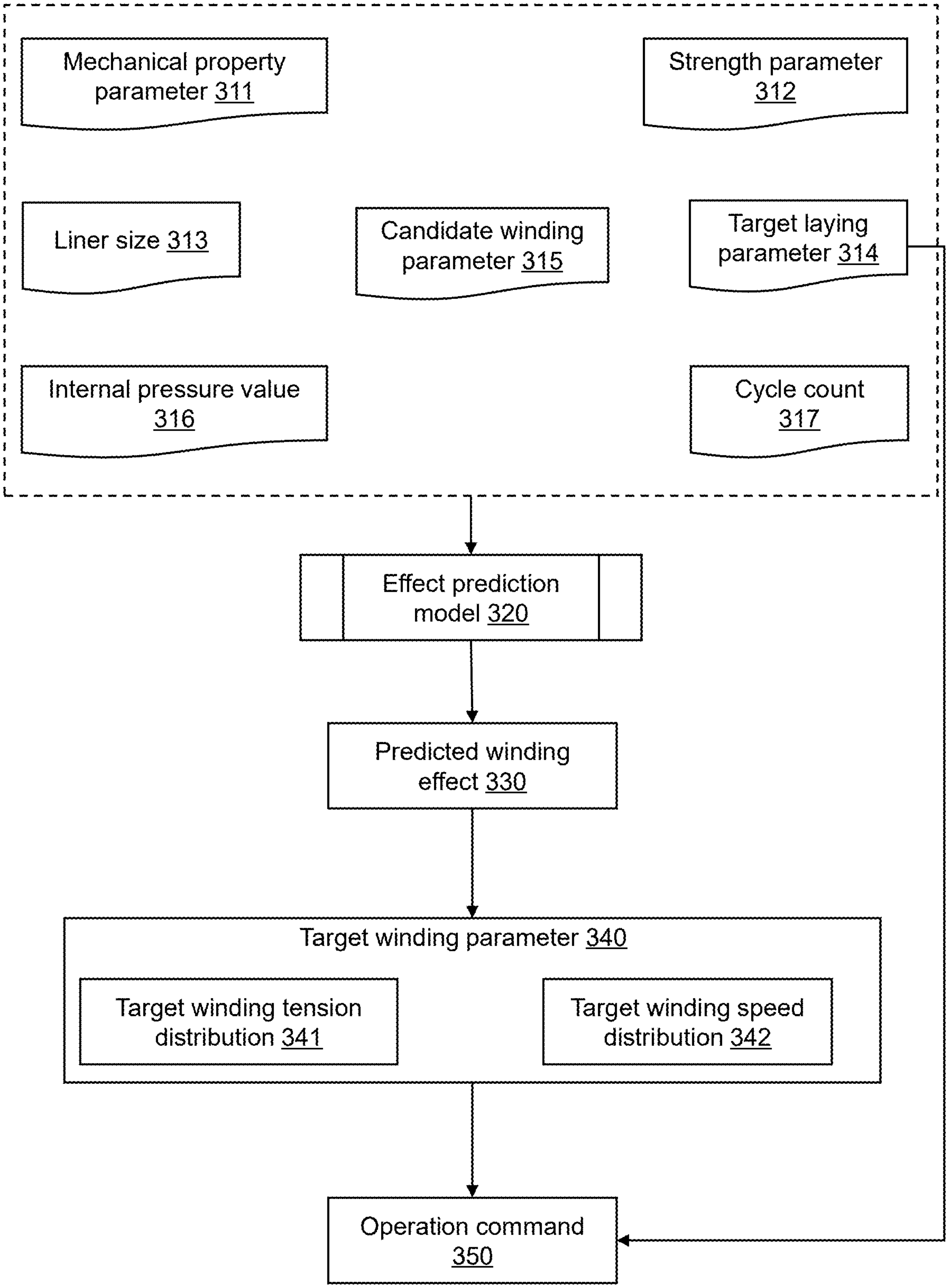
FIG. 3 is a schematic diagram illustrating an exemplary process for determining a target winding parameter according to some embodiments of the present disclosure.

More details regarding the target winding speed distribution, the target winding tension distribution may be found in other contents of the present disclosure (e.g., FIG. 3).

In some embodiments, the processor 150 may be communicatively connected to the winding mechanism 112 to control the winding mechanism 112 to wind the composite material (e.g., a carbon fiber tape, a prepreg, etc.) around a surface of the liner of the hydrogen storage tank in a corresponding hoop or helical manner, according to a target laying parameter (e.g., the target winding tension distribution, the target winding speed distribution, etc.) to form the inner and outer walls structure.

The monitoring unit 120 may be configured to monitor and record the winding process on the production line in real time.

In some embodiments, the monitoring unit 120 may include an imaging component 121 disposed on the production line.

The imaging component 121 refers to an optical or electronic imaging device for capturing and recording critical information during the winding process. For example, the imaging component 121 may include a camera, an infrared thermal camera, a laser scanner, etc. The critical information may include, but not limited to, a count of winding layers, a winding angle, a winding manner, a winding state, etc.

In some embodiments, the processor 150 may be communicatively connected to the imaging component 121 to obtain image data during a process of winding the composite material layer around the liner periodically or in real time.

In some embodiments, the imaging component 121 may be mounted near or above the winding mechanism 112 for photographing the winding process of the composite material at various positions on the liner.

The user terminal 130 refers to a terminal device that provides an operating function and a display function, etc., to interact with a user. In some embodiments, the user terminal 130 may be based on a user input or other operations, send the user input to a storage module and/or the processor 150 for storage and/or subsequent processing. The user input may include, for example, actual measurement data of a finished product.

In some embodiments, the user terminal 130 may include a mobile device, a tablet, a laptop, etc., or any combination thereof.

In some embodiments, the user terminal 130 may be communicatively connected to the processor 150, the monitoring unit 120, and other devices via a wired or wireless network to provide the user with intuitive and convenient operation interface and data display. For example, the user terminal 130 may be capable of receiving and displaying in real time the image data collected by the monitoring unit 120.

The design terminal 140 refers to a system or related application with computing capabilities, such as a computer, a computing cloud platform, a simulation, and analysis software, etc. In some embodiments, the design terminal 140 may include one or more sub-processors. For example, a central processing unit (CPU), a graphics processing unit (GPU), etc. or any combination of the above.

In some embodiments, the design terminal 140 may obtain a finite element simulation command from, for example, the processor 150, and execute a program command based on a result of the finite element simulation command for the design and optimization of the hydrogen storage tank. In some embodiments, the design terminal 140 may perform a plurality of rounds of iterations based on the finite element simulation command, with each of the plurality of rounds of iterations at least including one finite element simulation, and the design terminal 140 may further obtain the target laying parameter based on the result of the finite element simulation obtained from the plurality of rounds of iterations. More details about this part may be found in other contents of the present disclosure (e.g., FIG. 2).

In some embodiments, the design terminal 140 may be focused on a product design phase of the hydrogen storage tank, as well as an ongoing optimization of the winding process during production. The design terminal 140 may be mounted on a computer workstation or a server used by a designer. For example, the computer workstation or the server may be located in a research and development center, an office, or a specialized control room. The designer may perform the finite element simulation, draw a laying scheme, optimize a design parameter, etc., via the design terminal 140.

The processor 150 may be configured to process information and/or data from at least one component of the production control system 100 for the hydrogen storage tank or an external data source (e.g., a cloud data center). The processor 150 may execute the program command based on the data, the information, and/or the processing result to perform one or more of the functions described in the present disclosure. For example, the processor 150 may obtain the target laying parameter (e.g., a count of hoop layers, a count of helical layers, and a helical winding angle) of the design terminal 140 and/or data uploaded by the user terminal 130 (e.g., the actual measurement data).

In some embodiments, the processor 150 may include one or more sub-processing devices (e.g., a single-chip processing device or a multi-chip processing device). Merely way of example, the processor 150 may include a CPU, an application-specific integrated circuit (ASIC), etc., or any combination thereof.

In some embodiments, the processor 150 may be connected to a network to communicate with one or more components (e.g., the operating unit 110, the monitoring unit 120, the user terminal 130, etc.) of the production control system 100 for the hydrogen storage tank. In some embodiments, the processor 150 may be integrated or included in one or more other components (e.g., the operating unit 110, the design terminal 140, etc.) of the production control system 100 for the hydrogen storage tank. For example, the processor 150 may be in a computing device mounted in the user terminal 130.

In some embodiments, the processor 150 may be responsible for real-time control and management of an entire production process of the hydrogen storage tank. The processor 150 may be communicatively connected to the operating unit 110, the monitoring unit 120, the design terminal 140, etc. The processor 150 may generate an operation command based on the target laying parameter provided by the design terminal 140, and send the operation command to at least one of the operating unit 110, the monitoring unit 120, and the design terminal 140 to ensure that the winding mechanism 112 is operated in accordance with the laying scheme. More contents may be found in the related description below.

In some embodiments, the system 100 may also include a storage module for storing data, a command, and/or any other information. For example, the storage module may store a liner size, the laying scheme, etc.

In some embodiments, the storage module may include a random-access memory (RAM), a read-only memory (ROM), etc., or any combination thereof. In some embodiments, the storage module may be integrated or included in one or more other components of the system 100 (e.g., the processor 150, the user terminal 130, etc.).

It may be noted that, the above description of the production control system 100 for the hydrogen storage tank and the components thereof are provided only for descriptive convenience, and do not limit the present disclosure to the scope of the cited embodiments. It may be understood that for those skilled in the art, after understanding the principle of the system, it may be possible to arbitrarily combine individual modules or form a sub-system to be connected to other modules without departing from this principle. For example, the individual modules may share a common storage module, and the individual modules may each have their own storage module. Morphs such as these are within the scope of protection of the present disclosure.

Figure 2:
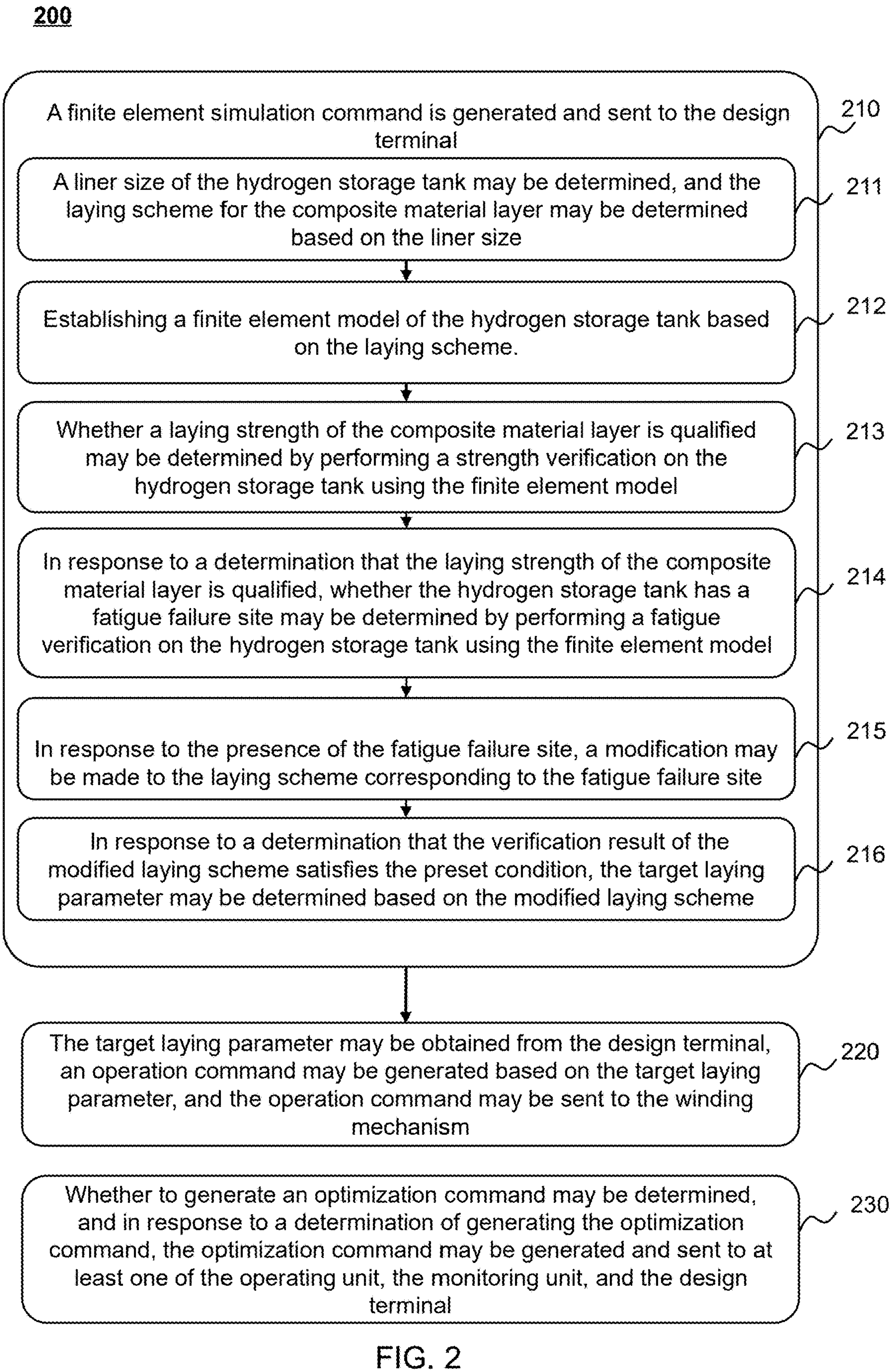
FIG. 2 is a flowchart illustrating an exemplary production control method for a hydrogen storage tank according to some embodiments of the present disclosure.

FIG. 2 is a flowchart illustrating an exemplary production control method for a hydrogen storage tank according to some embodiments of the present disclosure.

In some embodiments, a process 200 may be implemented by a processor or a design terminal of the production control system for the hydrogen storage tank. As shown in FIG. 2, the process 200 includes the following steps.

Step 210, a finite element simulation command may be generated and sent to the design terminal. Step 210 may be executed by the processor.

The finite element simulation command refers to a series of operational commands or scripts configured to instruct computer software to perform a finite element simulation during a design and analysis of the hydrogen storage tank. The finite element simulation refers to a process of simulating and predicting a performance of the hydrogen storage tank under different loading conditions, such as a stress distribution, a strain behavior, a fatigue life, a potential failure mode, and other mechanical performances, in a design and manufacture of the hydrogen storage tank.

In some embodiments, the design terminal may be subjected to the finite element simulation via finite element analysis software.

In some embodiments, the processor may determine the finite element simulation command based on a manual output.

In some embodiments, the finite element simulation command may be configured to perform a plurality of rounds of iterations. Each of a plurality of rounds of iterations may include at least one finite element simulation, and the processor may obtain a target laying parameter based on a result of the finite element simulation obtained from the plurality of rounds of iterations.

The result of the finite element simulation refers to a series of data and conclusions drawn after a computer simulation of the hydrogen storage tank or other structure using the finite element simulation. For example, the result of the finite element simulation may include a stress distribution of the hydrogen storage tank, a strength verification result, a fatigue verification result, etc. The stress distribution may be used to reflect a magnitude of stress generated in various portions of the hydrogen storage tank. More details regarding the strength verification result and the fatigue verification result may be found in the relevant descriptions under FIG. 2.

The target laying parameter refers to a laying scheme used for an actual production of the hydrogen storage tank.

In some embodiments, the processor may perform the plurality of rounds of iterations based on the design terminal to determine a target laying scheme. Each of the plurality of rounds of iterations may include step 211-step 216 performed based on the design terminal.

Step 211, a liner size of the hydrogen storage tank may be determined, and the laying scheme for the composite material layer may be determined based on the liner size.

The liner size refers to a geometric size of an internal space of the hydrogen storage tank. For example, the liner size may include a diameter, a length, a wall thickness, or other relevant sizes of an interior of the hydrogen storage tank.

In some embodiments, the design terminal may obtain the liner size of the hydrogen storage tank by means of a storage module, a manual input, or by reading a production schedule.

The composite material layer refers to a structural layer in which different materials or different forms of the same material are stacked and tightly bonded together in layers during a manufacturing process. The composite material layer may be configured to encase an outer wall of the liner. For example, the composite material may include a reinforcing material and a matrix material. The reinforcing material refers to a material that provides properties of high strength and high modulus, such as carbon fibers, glass fibers, etc. The matrix material may be configured to carry and bond the reinforcing material, such as resins, ceramics, metals, etc.

The laying scheme refers to information related to design and manufacture of the composite material layer. For example, the laying scheme may include at least one or any combination of a laying manner, a laying angle, a material selection of the reinforcing material and the matrix material, and a laying sequence, etc., for the composite material layer. The laying manner may include, but not limited to, a helical winding, a hoop winding, or laying in accordance with a preset two-dimensional or three-dimensional path, etc. The laying sequence refers to a sequence of various laying manners, a sequence in which the composite material is laid, etc.

In some embodiments, the laying scheme may include at least one of a count of hoop layers, a count of helical layers, and a helical winding angle.

The count of hoop layers refers to a count of the hoop layers in a hoop direction. The hoop layers refer to fiber tapes or fiber tows that are continuously wound on an outer surface of a liner in a direction perpendicular to an axis of a container along a circumference of the container, to form circles of tightly stacked composite material layers.

The count of helical layers refers to a count of the helical layers in a helical manner. The helical layers refer to fiber tapes or fiber tows that are continuously wound on the outer surface of the liner in accordance with a certain helical trajectory to form a layer of helically shaped composite material.

The helical winding angle refers to an angle between the continuously wound fiber tape or fiber tow along the helical trajectory and the axis of the hydrogen storage tank. The matrix material (e.g., the resin) may be applied during or after a winding process to hold the reinforcing material in place and fill gaps between the reinforcing material layers to form a structure of the final composite material layer.

In some embodiments, the laying scheme of the composite material layer may be determined based on the liner size using a variety of manners such as a manual analysis, a theoretical calculation, and/or a modeling, etc.

In some embodiments, the design terminal may obtain a single layer thickness of the helical layer and a single layer thickness of the hoop layer; determine a fiber thickness of helical winding and a fiber thickness of hoop winding; determine the count of hoop layers based on the fiber thickness of the hoop winding and the single layer thickness of the hoop layer; and determine the count of helical layers based on the fiber thickness of the helical winding and the single layer thickness of the helical layers.

The single layer thickness of the helical layer refers to a thickness of each layer that is continuously winding on the outer surface of the liner in accordance with a certain helical trajectory in the direction perpendicular to the axis of the hydrogen storage tank.

The single layer thickness of the hoop layer, on the other hand, refers to a thickness of each layer winding along the circumference of the hydrogen storage tank in the direction perpendicular to the axis of the hydrogen storage tank.

In some embodiments, the design terminal may obtain the single layer thickness of the helical layer and the single layer thickness of the hoop layer based on the manual input, the storage module, or the production schedule.

The fiber thickness of the helical winding refers to a stuck thickness of the helical layer in the direction perpendicular to the axis of the hydrogen storage tank.

The fiber thickness of the hoop winding refers to a cumulative thickness of the hoop layer in the direction perpendicular to the axis of the hydrogen storage tank.

The fiber tape or the fiber tow refers to the reinforcing material in the composite material, which is a tape or tow a with certain width and thickness formed by continuous or short-cut high-strength fibers (e.g., the carbon fibers, the glass fibers, or other high-performance synthetic fibers) through clustering, weaving, or winding.

In some embodiments, the design terminal may calculate the fiber thickness of the helical winding and the fiber thickness of the hoop winding, in various manners. For example, the design terminal may filter the fiber thickness of historical helical winding, the fiber thickness of historical hoop winding of the hydrogen storage tanks with the same or similar laying schemes in historical data as the fiber thickness of the helical winding and the fiber thickness of the hoop winding.

In some embodiments, the design terminal may determine the fiber thickness of the helical winding and the fiber thickness of the hoop winding based on an outer surface radius of a liner tank section, a designed burst pressure, a tensile strength of the composite material, and a winding angle.

In some embodiments, the design terminal may determine the fiber thickness of the helical winding, the fiber thickness of the hoop winding, etc., by a preset rule, based on the outer surface radius of the liner tank section, the designed burst pressure, the tensile strength of the composite material, and the winding angle. For example, the preset rule may be: the greater the outer surface radius of the liner tank section, the greater the designed burst pressure, the smaller the tensile strength of the composite material, and the smaller a value of cosine function of the winding angle, then the greater the fiber thickness of the helical winding; the greater the outer surface radius of the liner tank section, the greater the designed burst pressure, the smaller the tensile strength of the composite material, and the smaller a value of a tangent function of the winding angle, then the greater the fiber thickness of the hoop winding.

Exemplarily, the preset rule may include formulas (1) and (2):

$$t_{f\alpha} = K\frac{RP_b}{2\delta\sigma_b\cos^2\alpha_0} \tag{1}$$

$$t_{f\theta} = \frac{RP_b}{2\sigma_b}\left(2 - \tan^2\alpha_0\right) \tag{2}$$

where, $t_{f\alpha}$ denotes a fiber thickness of the helical winding, $t_{f\theta}$ denotes the fiber thickness of the hoop winding, R denotes the outer surface radius of the liner tank section; $P_b$ denotes the designed burst pressure; K denotes a strength reinforcement coefficient; $\delta$ denotes a stress balance coefficient; $\sigma_b$ denotes the tensile strength of a composite material; and $\alpha_0$ denotes the winding angle.

In this case, the outer surface radius of the liner tank section refers to a radius of an outermost layer of the liner tank section of the hydrogen storage tank (i.e., the surface in a direct contact with external environment). As outer surface radius of the liner tank section increases, a required fiber thickness of the helical winding, and the fiber thickness of the hoop winding may need to be recalculated or adjusted.

The designed burst pressure refers to a maximum internal pressure that the hydrogen storage tank is able to withstand. When the designed burst pressure increases, to ensure a safety performance of the hydrogen storage tank, the fiber thickness of the helical winding and the fiber thickness of the hoop winding may need to be increased accordingly.

The stress balance coefficient refers to a parameter value used to adjust the stress distribution in the composite material layer.

The strength reinforcement coefficient refers to a correction value configured to improve a design safety of the composite material layer. In some embodiments, the strength reinforcement coefficient may take value in a range of 1.05 and 1.4. When designing the composite material layer of a Type IV hydrogen storage tank, the strength reinforcement coefficient may be configured to enhance an ability of the hydrogen storage tank structure to resist an internal pressure and to ensure that the hydrogen storage tank structure is able to withstand a burst pressure far in excess of an operating pressure under an actual application condition.

The tensile strength of a composite material refers to the maximum tensile force that the composite material withstands. The composite material refers to a material that is made by physically or chemically compositing two or more materials with different properties or different forms.

The winding angle refers to an angle of inclination of the fiber tape or fiber tow with respect to the axis of the hydrogen storage tank during the winding process of the composite material layer. In some embodiments, the winding angle in formula (1) and formula (2) may be a helical winding angle, while the hoop winding angle may be a fixed value of 90°.

In some embodiments, the design terminal may obtain the outer surface radius of the liner tank section, the designed burst pressure, the tensile strength of a composite material, the stress balance coefficient, the strength reinforcement coefficient, and the winding angle based on the manual input or the storage module.

In some embodiments of the present disclosure, the calculating, by formulas, the fiber thickness of the helical winding, and the fiber thickness of the hoop winding, based on the outer surface radius of the liner tank section, the designed burst pressure, the tensile strength of a composite material, and the winding angle, may ensure an accuracy of the designed composite material layer, avoid errors due to empirical estimation, make the mechanical performances of the composite material layer closer to the design expectation, and improve an structural integrity of the hydrogen storage tank.

In some embodiments, the count of helical layers may be positively correlated with a ratio value of the fiber thickness of the helical winding to the single layer thickness of the helical layer. The count of hoop layers may be positively correlated with a ratio of the fiber thickness of the hoop winding and the single layer thickness of the hoop layer.

In some embodiments, the design terminal may determine the count of helical layers as well as the count of hoop layers based on formulas (3) and (4):

$$n_\alpha = t_{f\alpha}/t_\alpha \quad (3)$$

$$n_\theta = t_{f\theta}/t_\theta \quad (4)$$

where, $t_\alpha$ denotes the single layer thickness of the helical layer, $t_\theta$ denotes the single layer thickness of the hoop layer, $t_{f\alpha}$ denotes the fiber thickness of the helical winding, $t_{f\theta}$ denotes the fiber thickness of the hoop winding, $n_\alpha$ denotes the count of helical layers, and $n_\theta$ denotes the count of hoop layers.

In some embodiments of the present disclosure, by measuring and calculating the single layer thickness of the helical layer as well as the single layer thickness of the hoop layer, it may be possible to accurately design a thickness distribution of the composite material layer, to improve the accuracy of a simulation calculation, and to ensure that a finite element model truly reflects an actual mechanical behavior, so as to accurately assess and predict the performance of the hydrogen storage tank under different working conditions.

Step 212, the finite element model of the hydrogen storage tank may be established based on the laying scheme.

The finite element model refers to a numerical computational model used to simulate and analyze the mechanical behavior of the actual structure of the hydrogen storage tank. The finite element model may enable, for example, a digital simulation of parameters such as a geometry shape, a material property, a constraint condition, and a load distribution of the hydrogen storage tank.

In some embodiments, the design terminal may build the finite element model of the hydrogen storage tank based on finite element analysis (FEA) software. The FEA software may include, but not limited to, an analysis system (ANSYS), an abaqus finite element analysis (ABAQUS), etc.

Step 213, whether a laying strength of the composite material layer is qualified may be determined by performing a strength verification on the hydrogen storage tank using the finite element model.

The laying strength may be configured to measure an ability of the composite material layer in the hydrogen storage tank structure to withstand a pressure load.

In some embodiments, the design terminal may perform the strength verification in a variety of ways based on the finite element model. For example, the design terminal may simulate the operating pressure or the burst pressure to which the hydrogen storage tank is actually subjected to by applying an internal pressure load to the interior of the finite element model of the hydrogen storage tank based on the finite element model; calculate the stress distribution of the hydrogen storage tank under the operating pressure or the burst pressure; determine a maximum stress point based on the stress distribution of the hydrogen storage tank; determine whether the hydrogen storage tank is able to withstand a preset burst pressure threshold without failure by determining whether the stress at the maximum stress point is greater than a stress limit value and whether a plastic region occurs: in response to that the stress at the maximum stress point is greater than the stress limit value or the plastic region does not occur, determine that the hydrogen storage tank is able to withstand the preset burst pressure threshold and the laying strength is qualified; and in response to that the stress at the maximum stress point is not greater than the stress limit value or the plastic region occurs, determine that the hydrogen storage tank is unable to withstand the preset burst pressure threshold and the laying strength is not qualified.

In some embodiments, the design terminal may determine that the laying strength of the composite material layer is qualified based on that an internal pressure value at a moment of burst failure satisfies a second condition. More contents on this may be found in the related description below.

In some embodiments, the design terminal may, in response to that the laying strength of the composite material layer is unqualified, adjust a winding layer angle by a machine learning model to obtain an updated laying scheme; and perform the strength verification based on the updated laying scheme, in response to a determination that a strength verification result is unqualified, re-adjust the updated laying scheme, and re-perform the strength verification until the laying strength of the composite material layer is qualified.

The updated laying scheme refers to a laying scheme that is obtained by adjusting the winding angle of a current adjusting laying scheme.

The machine learning model may be an algorithm or a model that is used to adjust the winding layer angle.

In some embodiments, the machine learning model may include one or a combination of a convolutional neural network (CNN), a recurrent neural network (RNN), and a deep neural network (DNN), etc.

In some embodiments, an input to the machine learning model may include a current adjusting laying scheme/or the winding layer angle, and an output may include a strength verification result of the hydrogen storage tank. The current adjusting laying scheme refers to a laying scheme whose strength verification result at the current moment is unqualified. The winding layer angle refers to the helical winding angle. In some embodiments, the processor may adjust the angle of the helical layer or the laying sequence of the current adjusting laying scheme, determine the updated laying scheme, take the updated laying scheme as the current adjusting laying scheme, re-perform the strength verification, and determine whether to adjust the updated laying scheme based on the strength verification result until the strength verification result is qualified.

In some embodiments, the design terminal may perform the strength verification again based on the updated laying scheme; in response to the strength verification result is unqualified, the above update steps may be repeated based on the updated laying scheme until the laying strength of the composite material layer is qualified.

In some embodiments of the present disclosure, the use of the machine learning model may allow for an automatic optimization and obtain the updated laying scheme without repeated manual trials, which greatly accelerates the design optimization, and saves time and cost.

In some embodiments, when performing the strength verification on the hydrogen storage tank, the design terminal may record the internal pressure value at the moment of burst failure of the hydrogen storage tank by continuously enhancing the internal pressure of the hydrogen storage tank. When the internal pressure value satisfies the second condition, the design terminal may determine that the laying strength of the composite material layer is qualified, and when the internal pressure value does not satisfy the second condition, the design terminal may determine that the laying strength of the composite material layer is unqualified.

The moment of burst failure refers to a moment in the finite element simulation model when the internal pressure of the hydrogen storage tank increases to a certain critical value, and the composite material layer of the hydrogen storage tank is permanently deformed or ruptured in an irrecoverable manner.

The internal pressure value may be configured to reflect the magnitude of the gas pressure inside the hydrogen storage tank.

The second condition may be a determination condition for assessing whether the laying strength of the composite material layer is qualified. For example, the second condition may include the internal pressure value being greater than the burst pressure threshold. The burst pressure threshold may be a system default value, a system preset value, etc.

In some embodiments, the burst pressure threshold may not be less than 157.5 MPa.

In some embodiments of the present disclosure, by setting a higher burst pressure threshold, it can be ensured that the hydrogen storage tank, when subjected to repeated pressure fluctuations and fatigue loads over a long period of time, has a greater strength reserve, which helps to prolong a service life of the tank and at the same time to enhance a reliability of the tank under a complex working condition.

In some embodiments of the present disclosure, the finite element simulation may accurately simulate the stress distribution and deformation of the hydrogen storage tank under different pressures, so as to accurately determine whether the strength of the composite material layer is able to withstand the burst pressure required by the design. Compared to physical tests, a computer simulation may be able to perform countless tests in a virtual environment without a need to consume real materials and high test costs, which are not subject to site and time constraints, and is conducive to a cost saving.

Step 214, in response to a determination that the laying strength of the composite material layer is qualified, whether the hydrogen storage tank has a fatigue failure site may be determined by performing a fatigue verification on the hydrogen storage tank using the finite element model: in response to a determination that the hydrogen storage tank does not have the fatigue failure site, the target laying parameter may be determined based on the laying scheme.

The fatigue verification refers to a process used to test and validate a durability of the hydrogen storage tank under a cyclic loading.

The fatigue failure site refers to a site where the hydrogen storage tank develops a fatigue crack or fails under the cyclic loading. For example, the fatigue failure site may include a region where cracks, microcrack extensions, plastic deformations, localized stress concentrations, etc., occur, or other regions that lead to a loss of structural functionality or a breach of integrity.

In some embodiments, the design terminal may perform the fatigue verification based on the finite element model in a variety of ways. For example, the design terminal may simulate a cyclic loading process of the hydrogen storage tank through the finite element model. One cyclic loading process may include: simulating a process of the internal pressure of the hydrogen storage tank gradually increasing from zero or a lower pressure value to the working pressure and then releasing to a lower pressure or zero with a hydrogen charging and discharging process in an actual using of the hydrogen storage tank.

In some embodiments, when repeating the cyclic loading process, the design terminal may determine whether the fatigue damage occurs to the structure and the material of the hydrogen storage tank within a preset time period and under repeated pressure changes, and determine a pressure interval of the hydrogen storage tank when the fatigue damage occurs; in response to a determination that the fatigue damage occurs to the structure and the material of the hydrogen storage tank, the design terminal may determine a point that the fatigue damage occurs to the structure and the material of the hydrogen storage tank as the fatigue failure site; in response to a determination that the fatigue damage does not occur to the structure and the material of the hydrogen storage tank, the design terminal may determine the laying scheme corresponding to that the fatigue damage does not occur as the target laying parameter.

In some embodiments, when the fatigue verification is performed on the hydrogen storage tank, the design terminal may, record a performance of the hydrogen storage tank during the cyclic loading at a preset pressure interval, and a cycle count corresponding to the time when the fatigue damage occurs to the hydrogen storage tank. When the cycle count satisfies a third condition, the design terminal may determine that the site of the fatigue damage belongs to the fatigue failure site, and when the cycle count does not satisfy the third condition, the design terminal may determine that the site is a life-qualified site.

The preset pressure interval refers to a pressure fluctuation experienced by the simulated hydrogen storage tank in the hydrogen charging and discharging process during the fatigue verification.

In some embodiments, the preset pressure interval may be determined based on experimentation or experience. The preset pressure interval may also be determined based on a range of pressure change of the hydrogen storage tank in actual operation, as well as relevant industry standards and safety requirements.

In some embodiments, the preset pressure interval may be [2 MPa, 87.5 MPa].

In some embodiments of the present disclosure, by cyclic loading over a wide range of pressure difference, whether there is a potential fatigue failure site in regions of drastic changes in stress or specific pressure intervals of the hydrogen storage tank, which can help to optimize the design of the laying scheme and improve the service life of the hydrogen storage tank.

The performance refers to a variety of physical and mechanical features exhibited by the hydrogen storage tank during the cyclic loading at the preset pressure interval. For example, the performance may include information such as a leakage, a crack extension condition, etc. The crack extension condition may be information related to the crack that occur in the hydrogen storage tank during the cyclic loading. For example, the crack extension condition may include the site, a time, a rate of extension, and a direction of the fatigue crack or failure.

The fatigue damage refers to a situation where the fatigue crack or failure occurs.

The cycle count refers to a count of cyclic loading processes that the hydrogen storage tank undergoes when the fatigue damage occurs.

The third condition refers to a determination condition used to determine the fatigue failure site or the life qualified site. The life qualified site refers to the site of the hydrogen storage tank that does not have cracks or failures, etc., under the cyclic loading. For example, the third condition may include the cycle count being below a count threshold. The count threshold may be determined based on experimentation or experience.

In some embodiments, the design terminal may simulate the repeated cyclic loading process of the hydrogen storage tank between the lowest pressure of 2 megapascals (MPa) and the highest pressure of 87.5 MPa based on the finite element model, record in detail the performance of each loading cycle. When there are leaks, cracks, and other information in the performance, the design terminal may determine that the hydrogen storage tank has suffered the fatigue damage, and record the cycle count when the fatigue damage occurs. When the cycle count is lower than a times threshold, the site where the fatigue damage occurs may be identified as the fatigue failure site; and when the cycle count is higher than the times threshold, the site where the fatigue damage occurs may be identified as the qualified life site. The times threshold may be a system preset value or a system default value.

In some embodiments of the present disclosure, by simulating the cyclic loading of the hydrogen storage tank within the preset pressure interval, the potential fatigue failure site may be accurately predicted and identified, so that the optimization may be carried out for the fatigue failure site at a design stage to improve an overall safety and service life of the hydrogen storage tank.

Step 215, in response to the presence of the fatigue failure site, a modification may be made to the laying scheme corresponding to the fatigue failure site.

In some embodiments, the design terminal may, in response to the presence of the fatigue failure site, preset a correspondence between positions of different fatigue failure sites and different modification information, determine the modification information by checking a table; and modify the laying scheme according to the fatigue failure site based on the modification information. The modification information may include one or a combination of increasing or decreasing the winding layers, adjusting the winding angle, and changing a type or specification of the material. The correspondence may be determined based on a priori knowledge or the historical data.

In some embodiments, while keeping a total count of winding layers of the hydrogen storage tank unchanged when modifying the laying scheme, in response to the fatigue failure site being the first region of the hydrogen storage tank the design terminal may increase a preset layer count of the helical layer at the fatigue failure site, and decrease the preset layer count of the helical layer in an adjacent site; and in response to the fatigue failure site being the second region of the hydrogen storage tank, the design terminal may adjust the helical winding angle at the fatigue failure site.

The first region is a fatigue failure region that requires a change in the laying scheme by increasing the count of helical layers. For example, the first region may include an opening of the hydrogen storage tank or a center region of a tail top of the hydrogen storage tank.

The center region of tail top refers to the center of a bottom of the hydrogen storage tank.

The preset layer count refers to a parameter value used to adjust the count of layers of the helical layer corresponding to the fatigue failure site.

In some embodiments, in the finite element simulation, the preset layer count may be determined based on a proportion of a target fatigue failure site in actual measurement data, and the actual measurement data may be obtained from a user terminal.

The target fatigue failure site refers to the fatigue failure site that is in the opening or the center region of tail top of the hydrogen storage tank.

The actual measurement data refers to the foregoing validation result obtained after actually performing the strength verification and the fatigue verification. In some embodiments, the actual measurement data may also include information on the fatigue failure site, such as, for example, the position, the size, etc. of the fatigue failure site.

In some embodiments, the processor may obtain the actual measurement data uploaded by the user via the user terminal.

In some embodiments, the processor may statistically analyze the plurality of the actual measurement data obtained to determine the proportion of a count of the target fatigue failure sites in a count of all fatigue failure sites. The preset layer count may be positively correlated to the proportion of the target fatigue failure sites.

In some embodiments of the present disclosure, by analyzing the actual measurement data, a critical site that is prone to fatigue failure during actual use or testing, such as, the opening or the center region of tail top of the hydrogen storage tank, may be identified. Determining the winding layers needs to be added based on the proportion of the fatigue failure sites may ensure that the critical site is additionally reinforced, thereby improving the fatigue life and safety of the entire hydrogen storage tank.

The total count of winding layers refers to a sum of all the count of helical layers and the count of hoop layers.

The adjacent site refers to a region surrounding the fatigue failure site of the hydrogen storage tank structure. For example, the adjacent site may include a region within a preset distance of the fatigue failure site. In some embodiments, the adjacent site may be a range of regular shapes (e.g., circles, rectangles, triangles, etc.) or a range of irregular shapes (e.g., irregular polygons). Merely as an example, the adjacent site may be a circular region centered on the fatigue failure site and radiused by a preset distance.

In some embodiments, the design terminal may take, based on a fact that the fatigue failure site is in the opening or the center of tail top, the helical layer corresponding to a undercut angle as a first helical layer, and increase no layers of the first helical layers in accordance with the same winding angle and the same winding manner of the first helical layer; and the design terminal may further take the helical layer of the adjacent site as a second helical layer, and reduce no layers of the second helical layers in accordance with the same winding angle and the same winding manner of the second helical layer.

The undercut angle refers to an angle to be cut during laying of the composite material layer. As the shape and size of the opening of the opening or the center region of tail top is limited, a certain fiber tapes or fiber tows may not be able to fit perfectly around an edge of the bottle opening when laying, and need to be cut to fit the angle of the bottle neck shape. In some embodiments, the design terminal may obtain the undercut angle based on manual input.

The second region refers to the fatigue failure region that requires a change in the laying scheme by adjusting the winding angle. For example, the second region may include a head section of the hydrogen storage tank not located in a minimum pole hole position.

The head section of the hydrogen storage tank refers to a circular or hemispherical structure that forms end of the hydrogen storage tank and is used to seal the ends of the tank to form an airtight space for storing hydrogen. The minimum pole hole position refers to the smallest sized region of the opening portion of the head section that is required for connection or installation.

In some embodiments, the design terminal may determine, based on the finite element model, a non-minimum pole hole position in the head section as the fatigue failure site, adjust the helical winding angle at the fatigue failure site, and obtain a modified laying scheme to increase the thickness of the composite material layer at the fatigue failure site. For example, the design terminal may reduce the helical winding angle at the fatigue failure site based on a preset value.

In some embodiments, the design terminal may continue to perform the strength verification and the fatigue verification on the modified laying scheme, and determine whether to continue the modification based on the verification results.

Step 216, in response to a determination that the verification result of the modified laying scheme satisfies the preset condition, the target laying parameter may be determined based on the modified laying scheme.

The preset condition refers to a condition for evaluating whether to complete a laying design for the hydrogen storage tank. For example, the preset condition may include that the verification result of the current laying scheme is satisfactory. The verification result may include the strength verification result and the fatigue verification result. In some embodiments, the preset condition may also include that a preset count of iterations reaches a count threshold.

In some embodiments, an input for the plurality of rounds of iterations may be related to the iteration round. When a first round of iteration is performed, the laying scheme for the current round of iteration may include an initial laying scheme; and when subsequent rounds of iterations are performed, the laying scheme for the current round of iteration may include the laying scheme modified in the previous round of iteration.

In some embodiments, in the non-final iteration of at least one round of iteration, the design terminal may establish the finite element model on the laying scheme of the current round, and perform the strength verification and the fatigue verification to generate the strength verification result and the fatigue verification result of the current round of iteration. Based on the strength verification result and the fatigue verification result of the current round, the design terminal may determine whether the strength verification result and the fatigue verification result are qualified. In response to a determination that the strength verification result and the fatigue verification result are unqualified, the design terminal may modify the laying scheme of the current round of iteration to obtain the laying scheme of the next round. In the last round of iteration, the design terminal may determine, based on the strength verification result and the fatigue verification result of the current round of iteration, whether the strength verification result and the fatigue verification result are both qualified; in response to a determination that the strength verification result and the fatigue verification result are both qualified, the design terminal may terminate the iteration, and take the laying scheme in which the strength verification result and the fatigue verification result are qualified as the target laying parameter.

In some embodiments, in response to a determination that a count of modifications of the laying scheme satisfies a first condition, and the verification result does not satisfy the preset condition, the design terminal may mark an unqualified site of the hydrogen storage tank based on a last modified laying scheme, and generate a reinforcement process command based on the unqualified site; the reinforcement process command including increasing a total count of winding layers of the hydrogen storage tank.

The first condition refers to a determination condition that evaluates whether the modification process satisfies the design requirements. For example, the first condition may include the count of modifications being greater than or equal to a modification threshold. The modification threshold may be a system preset value, a system default value.

The count of modifications may include all modifications to the laying scheme of the composite material layer. For example, the modifications may include modifications to adjust the winding layer angle by the machine learning model when the strength verification result of the hydrogen storage tank shows that the laying strength of the composite material layer is unqualified, and may further include modifications to the laying scheme for the fatigue failure site when the fatigue verification result shows the existence of the fatigue failure site.

The reinforcement process command refers to an improvement measurement or requirement for the laying scheme of the unqualified parts (for example, the fatigue failure sites, etc.) in the design and manufacturing process of the hydrogen tank. For example, the reinforcement process command may include, but not limited to, adding the preset layer count to the unqualified part, changing the winding layer angle, using a higher-performance composite material, or adding some other form of reinforcing structure.

In some embodiments, the design terminal may determine the reinforcement process command in various manners. For example, the design terminal may preset a correspondence between different unqualified parts and different reinforcement process commands based on the historical data, and determine the reinforcement process command by checking the table.

In some embodiments of the present disclosure, although adding reinforcement may result in an increase in the total count of winding layers, which increases a weight of the composite material layer, adding reinforcement may be beneficial to ensure that the hydrogen storage tank as a whole maintains a requisite strength and fatigue life after a localized reinforcement to meet safety and performance standards.

Step 220, the target laying parameter may be obtained from the design terminal, an operation command may be generated based on the target laying parameter, and the operation command may be sent to the winding mechanism. The step 220 may be performed by the processor.

The operation command may be configured to direct the winding mechanism in the operating unit to perform precise winding operations according to the target laying parameter.

In some embodiments, the processor may send the corresponding operation command to the winding mechanism on the production line through a network communication or an interface. The winding mechanism, after receiving the command, may automatically adjust an operation state (e.g., starting winding, etc.) and a process parameter (e.g., adjusting the count of winding layers, etc.) according to contents of the operation command, so as to perform a winding operation of the composite material.

Step 230, whether to generate an optimization command may be determined, and in response to a determination of generating the optimization command, the optimization command may be generated and sent to at least one of the operating unit, the monitoring unit, and the design terminal. Step 230 may be performed by the processor.

The optimization command refers to a command configured to adjust the operation state of one or more components of the production control system for the hydrogen storage tank.

In some embodiments, the optimization command refers to a command for adjusting the operation states of the operating unit, the monitoring unit, and the design terminal, etc. In some embodiments, the optimization command may include one or more commands. For example, a command corresponding to adjusting the winding angle, etc.; a first optimization command corresponding to a meshing accuracy; and a second optimization command corresponding to adjusting a monitoring parameter of the monitoring unit.

More contents regarding the operating unit, the monitoring unit, and the design terminal may be found in related descriptions in FIG. 1.

Figure 4:
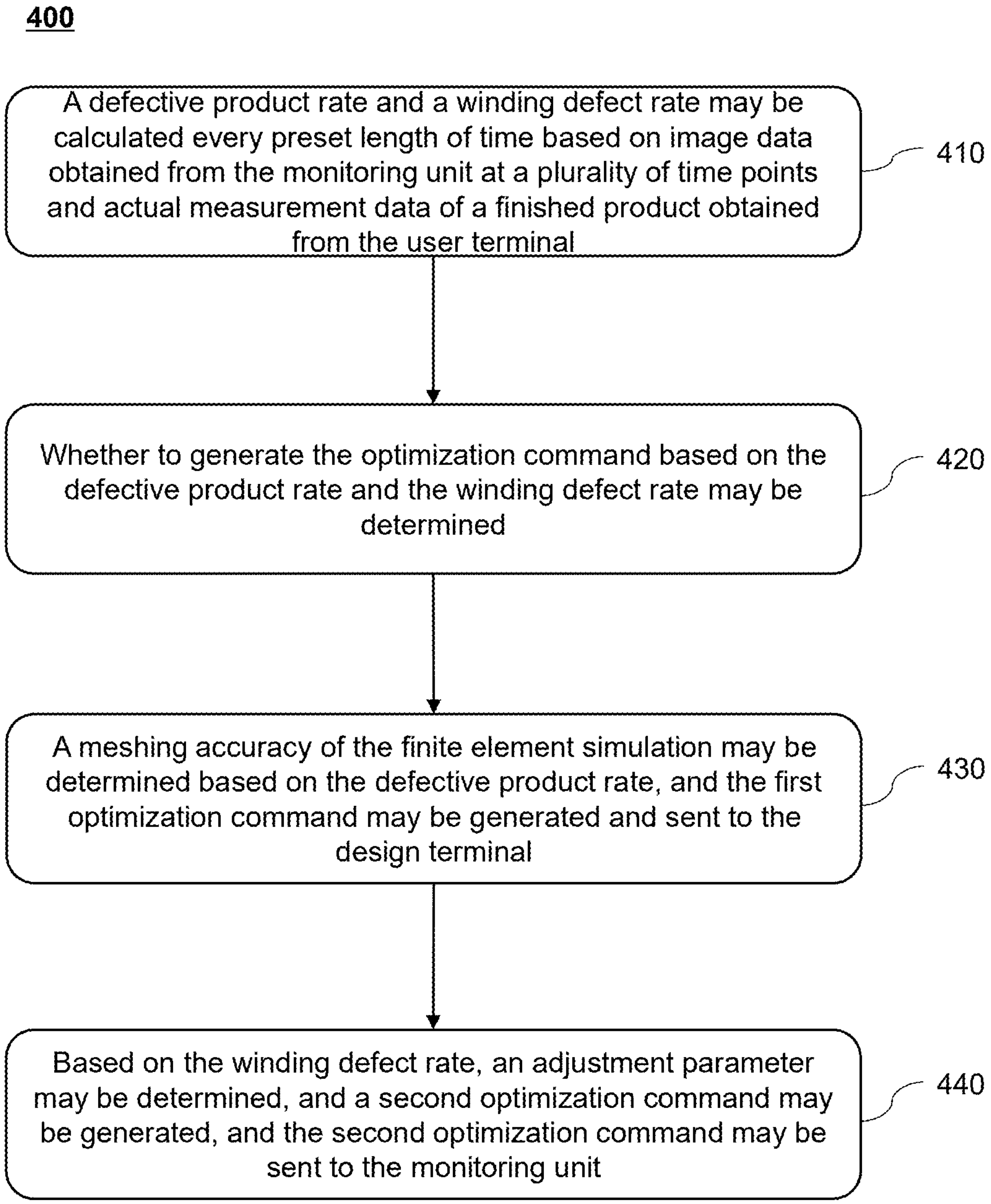
FIG. 4 is a flowchart illustrating an exemplary process for generating an optimization command according to some embodiments of the present disclosure.

More contents regarding the first optimization command and the second optimization command may be found in related descriptions in FIG. 4.

In some embodiments, the processor may send a control command to a corresponding device (e.g., the operating unit, the monitoring unit, the design terminal, etc.) to control the operation of the corresponding device. For example, the processor may send the command corresponding to adjusting the winding angle to the operating unit, control the winding mechanism to adjust an angle for winding the hydrogen storage tank. For another example, the processor may send the command corresponding to the meshing accuracy to the design terminal to control the design terminal to reperform the finite element simulation based on the meshing accuracy.

In some embodiments, the processor may determine to generate the optimization command based on a fact that a failure rate of the hydrogen storage tank produced on the production line is greater than a preset threshold. The preset threshold may be a system default value, a system preset value, etc.

In some embodiments, the processor may determine whether to generate the optimization command based on a defective product rate and a winding defect rate, more details may be found in related descriptions in FIG. 4.

In some embodiments, the method may further include: determining a position distribution of the fatigue failure site by performing statistics on finite element simulations in historical data; and generating an angle control command based on the position distribution and send the angle control command to the imaging component.

The position distribution of the fatigue failure site refers to a frequency distribution of a fatigue damage at different positions in the structure of the hydrogen storage tank.

The angle control command may be configured to adjust an imaging angle of the imaging component on the production line. The imaging angle refers to the angle at which a lens or a sensor of the imaging device takes a picture of the hydrogen storage tank. For example, the imaging angle may include a pitch angle (up and down view), a yaw angle (left and right view), etc.

In some embodiments, the processor may generate the angle control command based on the position distribution in a variety of ways. For example, the processor may set a position with the highest frequency of the fatigue damage in the position distribution as the position that the imaging component needs to be aligned to; obtain a current actual imaging angle of the imaging component, including the pitch angle, the yaw angle, etc., calculate an angle adjustment value of the imaging device according to the position to be aligned and the current actual imaging angle, and determine the angle control command. The angle control command may include a pitch angle adjustment value, a yaw angle adjustment value, etc.

In some embodiments, the processor may send the angle control command to the imaging component via a network.

In some embodiments of the present disclosure, a high-risk region for the fatigue failure may be identified by analyzing the historical data, and the processor may control the imaging component to focus on the high-risk region in a targeted way to monitor the high-risk region, and to improve an identification and capture ability of the fatigue failure site and avoid wasting resources on low-risk regions.

In some embodiments of the present disclosure, by calculating an overall laying strength and fatigue property of the hydrogen storage tank, the mechanical property at the opening of the tank may be more accurately determined, so as to provide more accurate calculation and design basis for the overall performance of the hydrogen storage tank in the process of hydrogen charging and discharging. Through the adjustment of the laying scheme of the composite material layer, while an overall internal pressure bearing capacity of the hydrogen storage tank is ensured, the sealing performance of the opening and the end of the bottle, as well as the fatigue performance of the metal and plastic parts may be improved. Ultimately, a qualified laying scheme may be obtained to achieve a lightweight design of the hydrogen storage tank laying, and at the same time avoid a shortcoming that it is necessary to change the overall design of the sealing structure of the opening of the bottle when the fatigue strength does not meet the requirements.

It may be noted that the foregoing description of the process is intended to be exemplary and illustrative only and does not limit the scope of application of the present disclosure. For those skilled in the art, various corrections and changes may be made to the process under the guidance of the present disclosure. However, these corrections and changes remain within the scope of the present disclosure.

FIG. 3 is a schematic diagram illustrating an exemplary process for determining a target winding parameter according to some embodiments of the present disclosure.

In some embodiments, as shown in FIG. 3, a processor may obtain a mechanical property parameter 311 and a strength parameter 312 of a composite material; determine, based on the mechanical property parameters 311, the strength parameter 312, a liner size 313, and a target laying parameter 314, a target winding parameter 340; generate, based on the target winding parameter 340 and the target laying parameter 314, an operation command 350, and send the operation command 350 to a winding mechanism.

More details regarding the liner size and the target laying parameter may be found in related descriptions in FIG. 2.

The mechanical property parameter refers to a feature of the composite material shown when subjected to a force. For example, the mechanical property parameter may include features such as a tensile strength, an elasticity modulus, a Poisson's ratio, etc.

The strength parameter refers to the maximum load that the composite material withstands. For example, the strength parameter may include the tensile strength, a bending strength, a shear strength, etc.

In some embodiments, the processor may obtain the mechanical property parameter and the strength parameter of the composite material based on a storage module or a manual input.

The target winding parameter refers to the control parameter used by the winding mechanism during a winding operation.

In some embodiments, the target winding parameter 340 may include a target winding tension distribution 341 and a target winding speed distribution 342, as shown in FIG. 3.

The target winding tension distribution may be used to reflect a distribution of winding tension required at different winding positions. The winding tension may be configured to reflect an amount of tension that needs to be maintained when the winding mechanism is winding a certain winding position.

The target winding speed distribution may be used to reflect the distribution of a winding speed required at different winding positions. The winding speed may be used to reflect a magnitude of the speed that needs to be maintained when the winding mechanism is winding a certain winding position.

In some embodiments, the processor may divide a liner of the hydrogen storage tank to obtain each winding position. The division may be performed according to a length segmentation of the liner, a circumferential equal division or according to a structure of the liner (e.g., a bottle opening, a bottle bottom, a transition section, etc.), etc.

In some embodiments, the processor may determine the target winding parameter based on the mechanical property parameter, the strength parameter, the liner size, and the target laying parameter through a preset table or a vector database constructed from historical data. The preset table or the vector database may be a table or database indicating the different mechanical property parameters, the different strength parameters, the different liner sizes, and the different target laying parameters with different target winding parameters.

More details regarding the determining the target laying parameters may be found below in FIG. 3.

In some embodiments, the processor may generate, based on the target winding parameter and the target laying parameter, corresponding operation commands and send the operation commands to the winding mechanism via a network, so as to control the winding mechanism to adjust the working state of the winding structure according to contents of the commands, such as, at different winding positions, adjusting a setting value of the tension of the tension control device, adjusting the setting value of the speed of the drive device, switching the winding mode of the winding head, etc.

In some embodiments, as shown in FIG. 3, the processor may generate a plurality of groups of candidate winding parameters 315; predict a predicted winding effect 330 corresponding to each group of candidate winding parameters by the effect prediction model 320; and determine the target winding parameter 340 based on the predicted winding effect 330 corresponding to the each group of candidate winding parameters.

The candidate winding parameters refer to a group of to-be-selected winding parameters generated to determine the target winding parameter.

In some embodiments, each group of candidate winding parameters may include a candidate winding tension distribution and a candidate winding speed distribution.

In some embodiments, the processor may generate the plurality of groups of candidate winding parameters in various ways. For example, the processor may determine the plurality of candidate winding parameters based on the winding parameters in historical data by random generation. For another example, the processor may generate one or more groups of candidate winding parameters by randomly adjusting one or more parameters based on winding parameters from the same time period in history.

The effect prediction model may be an algorithm or model configured to predict the predicted winding effect corresponding to the candidate winding parameter.

The predicted winding effect refers to a prediction result of a performance indicator (e.g., a laying strength, a fatigue life, etc.) that is able to be achieved by the hydrogen storage tank after winding with specific winding parameters in actual production.

In some embodiments, the predicted winding effect may be expressed in various ways such as a numerical value, a percentage, etc. The higher the numerical value, the better the predicted winding effect.

In some embodiments, the effect prediction model may be a machine learning model. For example, the effect prediction model may be a machine learning model with a custom structure as described below. The effect prediction model may also be a machine learning model of other structures, including one or a combination of a CNN, an RNN, a DNN, etc.

In some embodiments, as shown in FIG. 3, an input of the effect prediction model 330 may include the mechanical property parameter 311 of the composite material, the strength parameter 312, the liner size 313, the target laying parameter 314, the candidate winding parameter 315, and an output of the effect prediction model may include the predicted winding effect 330 corresponding to the candidate winding parameter.

In some embodiments, a server may perform the effect prediction model based on each group of candidate winding parameters individually, output the corresponding predicted winding effect; and determine, based on the predicted winding effects corresponding to the plurality of groups of candidate winding parameters, the candidate winding parameter with the greatest predicted winding effect as the target winding parameter.

In some embodiments, as shown in FIG. 3, an input of the effect prediction model 320 also include an internal pressure value 316 corresponding to a moment of burst failure for the target laying parameter in a plurality of rounds of finite element simulation, and a cycle count 317 corresponding to the occurrence of a fatigue damage.

More contents regarding the internal pressure value at the moment of burst failure, and the cycle count corresponding to the occurrence of the fatigue damage may be found in related descriptions in FIG. 2.

In some embodiments of the present disclosure, when predicting the predicted winding effect, it may be necessary to not only take into account a property of the composite material, a working parameter during winding, etc., but also take the test result of the finite element simulation as a reference, so as to provide more effective information for the prediction. In this way, the uncertainty of the prediction may be better eliminated, and a more accurate predicted winding effect may be obtained.

In some embodiments, the effect prediction model may be obtained based on a great number of labeled training samples trained in various feasible ways. For example, parameter updates may be performed based on a gradient descent method. An exemplary training processes may include: inputting a plurality of training samples with labels into an initial effect prediction model, constructing a loss function based on the labels and the results of the initial effect prediction model, and iteratively updating parameters of the initial effect prediction model based on the loss function by gradient descent or other methods. When a preset condition is met, the model training may be completed, and a trained effect prediction model may be obtained. The preset condition may be that the loss function converges, a count of iterations reaches a threshold, etc.

In some embodiments, there may be a plurality of groups of training samples, each of which at least includes the mechanical property parameter of a sample composite material, a sample strength parameter, a sample liner size, a sample target laying parameter, and a sample winding parameter. The training samples may be obtained based on the historical data.

In some embodiments, the labels may include an actual winding effect corresponding to the sample winding parameter. The labels may be obtained by the processor or a manual labeling. For example, the actual winding effect may be determined experimentally by human based on the sample winding parameter of the hydrogen storage tank.

In some embodiments, when the input to the effect prediction model also include the internal pressure value at the moment of burst failure corresponding to the target laying parameter and the cycle count corresponding to the time when the fatigue damage occurs in the plurality of rounds of finite element simulations, the training samples may also include a sample internal pressure value at the moment of burst failure corresponding to the target laying parameter and the sample cycle count corresponding to the time when the fatigue damage occurs in the plurality of rounds of finite element simulations.

In some embodiments, the strength verification and the fatigue verification may be performed manually based on the hydrogen storage tank obtained by actual winding, and the labels may be obtained based on an actual internal pressure value at the moment of burst failure obtained from a testing and an actual cycle count corresponding to the fatigue damage. For example, the greater the actual internal pressure value at the moment of burst failure and the greater the actual cycle count corresponding to the fatigue damage, the greater a value of the actual winding effect.

In some embodiments of the present disclosure, by generating the plurality of groups of candidate winding parameters, a wider space for the winding scheme may be obtained, which helps to discover a more optimal combination of winding parameters, and to improve the mechanical property, the laying strength, the safety and other indicators of the hydrogen storage tank. By comparing the predicted winding effects of the plurality of groups of candidate winding parameters through the effect prediction model, the optimal winding parameters may be quickly screened out, so as to reduce a time cost of repeated tests and adjustments, and improve the design and production efficiency.

In some embodiments, the processor may perform the plurality of rounds of iterative trainings on the effect prediction model, each round of iterative training including: updating a network parameter of the effect prediction model based on a sample prediction value, a sample true value selected for the current round of iteration, and a learning rate for the current round of iteration.

The sample prediction value refers to the predicted winding effect corresponding to the output from the effect prediction model based on processing a certain group of training samples.

The sample true value refers to the actual winding effect corresponding to a certain group of training samples.

The learning rate refers to a parameter configured to control a magnitude of weight updates in a machine learning algorithm. In some embodiments, the learning rate may be a configurable parameter used in the training of the effect prediction model, and the value of the learning rate may be a relatively small positive value, e.g., a value of the learning rate may be in a range between 0.0 and 1.0. The weight may be a parameter used in the effect prediction model to calculate and estimate a relationship between the input and output samples.

In some embodiments, the processor may set, for the initial effect prediction model, an initial value of a tuning parameter as the learning rate, which is dynamically adjusted as the plurality of rounds of iterative trainings are performed.

In some embodiments, the learning rate of each iteration may be negatively correlated to a sample outlier selected for the iteration. For example, a relatively great sample outlier may indicate that the group of training samples is weakly representative, and thus the learning rate may be set to a relatively small value when learning from the group of training samples, so as to prevent the effect prediction model from overfitting.

The sample outlier refers to a degree to which a particular group of training samples deviates relative to other groups of training samples.

In some embodiments, the sample outlier may be determined based on the sample internal pressure value as well as the sample cycle count. For example, for each group of training samples, the processor may calculate an absolute value of a difference between the sample internal pressure value and the corresponding average value (i.e., a first difference) and the absolute value of the difference between the sample cycle count and the corresponding average value (i.e., a second difference) based on the sample internal pressure values and the sample cycle count of the group of training samples, and the average value of the sample internal pressure values and the average value of the sample cycle counts of all of the training samples in the training dataset. The processor may further determine the sample outlier of the group of training samples based on summing up the first difference and the second difference. For example, the greater the difference, the greater the sample outlier for the group of training samples.

In some embodiments, the processor may construct the loss function (e.g., a mean square error, a cross entropy, etc.) based on the sample prediction value and the sample true value, and iteratively update the network parameters of the initial effect prediction model based on the loss function and the learning rate of the current round of iteration through the gradient descent or other methods.

In some embodiments of the present disclosure, in each round of iteration, the learning rate may be dynamically adjusted according to the sample outlier, the sample with higher sample outlier may have situations of abnormal, important or boundary, and may be given a smaller learning rate, which helps the effect prediction model to learn the features and laws of the samples more effectively, and improves an adaptive ability of the model, so as to enable the effect prediction model to maintain good prediction performance in the face of a variety of complex situations in actual production.

In some embodiments of the present disclosure, by obtaining material properties such as the mechanical property parameter and the strength parameter of the composite material, combined with the liner size and the target laying parameter, the key parameters (such as the tension, the speed, the angle, the count of layers, etc.) in the winding process may be precisely calculated and set to ensure that the winding process is highly matched with the material properties and the design requirements of the tanks, so as to realize precise design and customized production.

FIG. 4 is a flowchart illustrating an exemplary process for generating an optimization command according to some embodiments of the present disclosure. In some embodiments, a process 400 may be implemented by a processor of a production control system for hydrogen storage tank. As shown in FIG. 4, the process 400 may include the following steps.

Step 410, a defective product rate and a winding defect rate may be calculated every preset length of time based on image data obtained from the monitoring unit at a plurality of time points and actual measurement data of a finished product obtained from the user terminal.

More details regarding the actual measurement data may be found in related descriptions in FIG. 2.

More details regarding the monitoring unit and the user terminal may be found in related descriptions in FIG. 1.

The preset length of time refers to a preset time range. The preset length of time may be determined based on a priori knowledge or historical data.

The image data refers to image information configured to reflect a liner surface state, a winding quality, and other information during the winding process of the liner.

In some embodiments, the processor may obtain the image data through an imaging component mounted on a production line. For example, the image data may be uploaded to the processor via a network after being obtained by the imaging component at the preset length of time. In some embodiments, the image data may be uploaded in real time to a storage module after being collected by the imaging component, and the processor may read the image data from the storage module at the preset length of time.

In some embodiments, the user terminal may upload the actual measurement data in real time to a storage module for saving. The processor may proactively obtain the actual measurement data from the storage module at the preset length of time.

The defective product rate refers to a proportion of the count of bad products in a total count of products produced over the preset length of time. The bad products may include the hydrogen storage tanks that are defective, do not meet a preset condition or use criteria.

In some embodiments, the processor may statistically analyze the actual measurement data over the preset length of time to determine the count of the bad products, and determine the defective product rate based on a ratio of the count of the bad products to the total count of products produced over the preset length of time.

The winding defect rate refers to a proportion of the count of hydrogen storage tanks with winding defect in the total count of products produced over the preset length of time.

In some embodiments, the processor may identify, based on the image data over the preset length of time, the hydrogen storage tanks with winding defect by an image recognition algorithm (e.g., a CNN, a support vector machine, etc.), and determine the winding defect rate based on a ratio value of the count of hydrogen storage tanks with winding defect to the total count of products produced over the preset length of time.

Step 420, whether to generate the optimization command based on the defective product rate and the winding defect rate may be determined.

In some embodiments, the processor may determine whether to generate the optimization command based on the defective product rate and the winding defect rate in various ways. For example, the processor may determine whether the defective product rate and the winding defect rate satisfy a fourth condition: in response to that the defective product rate and the winding defect rate satisfy a fourth condition, the processor may determine that the optimization command is generated.

The fourth condition refers to a determination condition for evaluating whether to generate the optimization command. For example, the fourth condition may include at least one of the defective product rate being greater than a first threshold, or that the winding defect rate is greater than a second threshold. The first threshold and the second threshold may be system default values, system preset values, etc.

Step 430, a meshing accuracy of the finite element simulation may be determined based on the defective product rate, and the first optimization command may be generated and sent to the design terminal.

The meshing accuracy refers to a parameter value that adjusts a mesh size used in meshing a finite element model.

In some embodiments, the processor may generate the corresponding meshing accuracy in response to that the defective product rate is greater than the first threshold. Different defective product rates may correspond to different meshing accuracies, and the higher the defective product rate, the higher the meshing accuracy.

The first optimization command may be configured to cause the design terminal to re-run the finite element simulation command based on the meshing accuracy in order to re-determine a target laying parameter.

In some embodiments, the processor may generate the corresponding first optimization command based on the meshing accuracy and send the first optimization command to the design terminal via a network. The design terminal may upsize, based on the meshing accuracy in the first optimization command, the current mesh size, rerun the finite element simulation command in a manner like that of FIG. 2, and divide, based on the upsized mesh size, the finite element model of the hydrogen storage tank.

More details regarding the finite element model may be found in other contents in FIG. 2. The current mesh size refers to the mesh size in the finite element simulation prior to the optimization command.

Step 440, Based on the winding defect rate, an adjustment parameter may be determined, and a second optimization command may be generated, and the second optimization command may be sent to the monitoring unit.

The adjustment parameter refers to a parameter value used to adjust a monitoring parameter of the monitoring unit.

The monitoring parameter of the monitoring unit refers to various parameters used by the monitoring unit in monitoring the winding process of the hydrogen storage tank. For example, the monitoring parameter may include a monitoring frequency, a monitoring accuracy, etc.

The monitoring frequency refers to a count of times the monitoring unit collects or generates data over a period of time. For example, the monitoring frequency may include a frequency of image collection by the imaging component, etc. The monitoring accuracy refers to a degree of precision of the data collected by the monitoring unit. For example, the monitoring accuracy may include, for example, an image resolution of the imaging component.

In some embodiments, the processor may generate the corresponding adjustment parameter in response to the winding defect rate being greater than the second threshold. For example, the higher the winding defect rate, the greater the adjustment parameter.

The second optimization command may be configured to adjust the monitoring parameters of the monitoring unit.

In some embodiments, the processor may generate, based on the adjustment parameter, the corresponding second optimization command, and send the second optimization command to the imaging device over the network. The imaging device may upsize, based on the adjustment parameter in the second optimization command, a current image collection frequency and the image resolution, and monitor, based on the upsized image collection frequency and the image resolution, the winding process of the hydrogen storage tank.

In some embodiments of the present disclosure, by regularly collecting the image data from the monitoring unit and the actual measurement data from the user terminal, the system may be able to understand in real time the actual operation of the production line, including key indicators such as the defective product rate and the winding defect rate. Based on the defective product rate and the winding defect rate, the system may generate the optimization command in a timely manner, dynamically adjust the mesh size of the finite element simulation and the monitoring parameter of the monitoring unit, and realize a continuous optimization of the production line, which are conducive to more accurately control the process parameters and the quality standard of the production line, and to improve the stability of the quality of the hydrogen storage tank.

One or more embodiments of the present disclosure may further provide a control device for a production control of the hydrogen storage tank. The control device may include a processor configured to perform a production control method of the hydrogen storage tank as described in one or more embodiments above.

One or more embodiments of the present disclosure may further provide a non-transitory computer-readable storage medium storing computer commands, and when the computer reads the computer commands in the storage medium, the computer performs a production control method of the hydrogen storage tanks as described in any one of the above embodiments.

In some embodiments, the strength verification may also be referred to as a finite element bearing strength analysis, the fatigue verification may also be referred to as a finite element fatigue life analysis, and the fatigue failure site may also be referred to as a site susceptible to fatigue failure.

According to the standard ISO/TS15869, ISO11439, GTR13, etc. on the destructive test pressure of high-pressure hydrogen storage tanks, a bursting pressure of the type IV 70 MPa hydrogen storage tanks may be higher than 2.25 times of a working pressure; and some more stringent standards requires the bursting pressure to be higher than 2.5 times the working pressure. At the same time, regarding the requirements on the fatigue life, according to the relevant standards, in a maximum 87.5 MPa pressure cycle, the hydrogen storage tank should be subjected to 22,000 cycles. In order to simultaneously consider a multi-scale mechanical rows under an ultimate load carrying capacity (i.e., the burst pressure) and a structural strength feature of the storage tank under a cyclic loading condition (i.e., the fatigue life), in some embodiments of the present disclosure, an experimental method, a theoretical computational method, and a finite-element computational method may be combined to accurately model and calculate the damages of Type IV hydrogen storage containers under different internal pressure loads.

Figure 5:
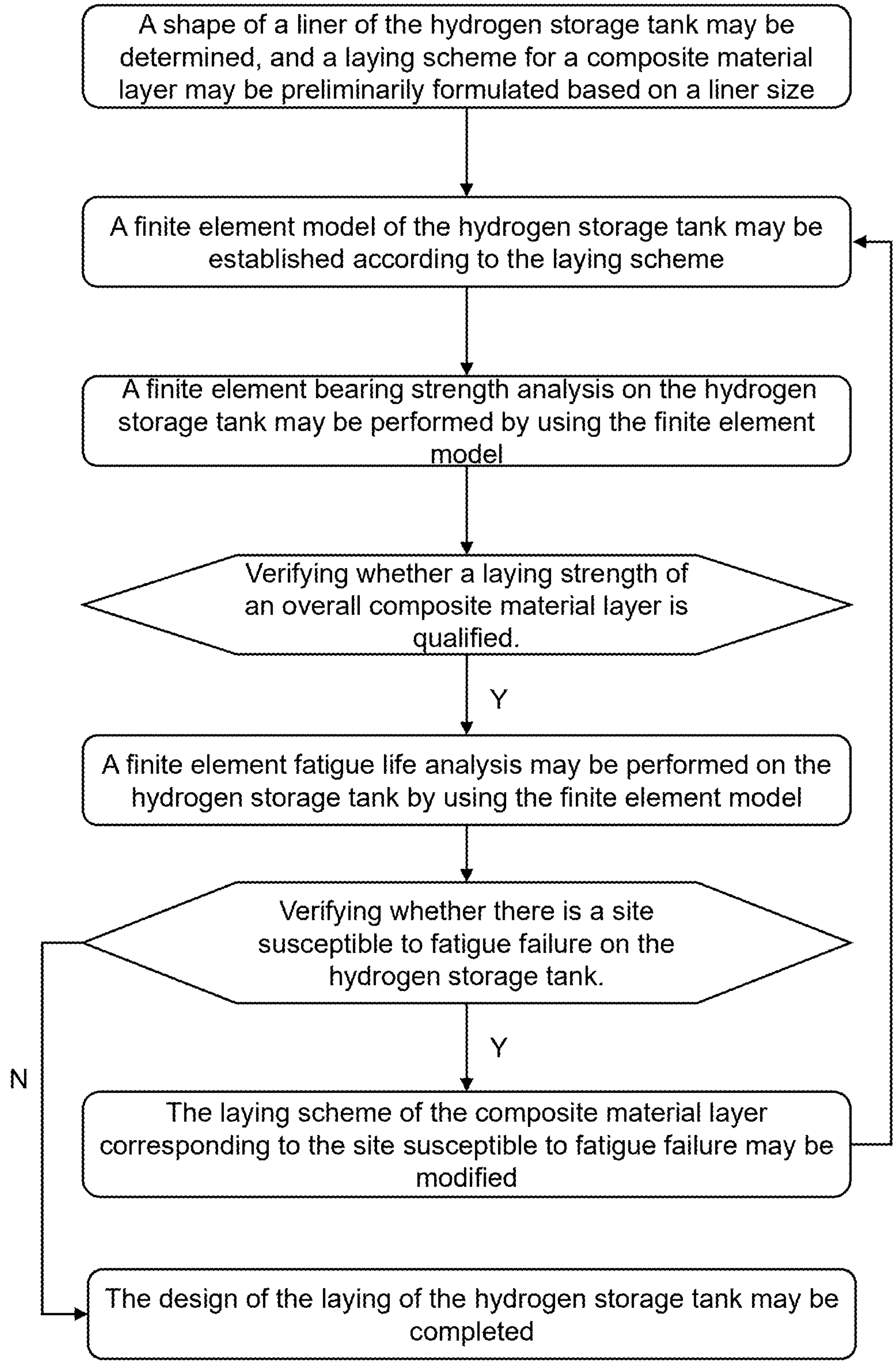
FIG. 5 is a schematic diagram illustrating an exemplary production control method for a hydrogen storage tank according to some embodiments of the present disclosure.

FIG. 5 is a schematic diagram illustrating an exemplary production control method for a hydrogen storage tank according to some embodiments of the present disclosure. As shown in FIG. 5, the embodiments of the present disclosure may provide a method for designing a laying of a Type IV hydrogen storage tank considering strength and fatigue life, including steps S1 to S6.

S1, a shape of a liner of the hydrogen storage tank may be determined, and a laying scheme for a composite material layer may be preliminarily formulated based on a liner size. The laying scheme may contain a count of hoop layers, a count of helical layers, and a helical winding angle.

S2, a finite element model of the hydrogen storage tank may be established according to the laying scheme.

S3, a finite element bearing strength analysis on the hydrogen storage tank may be performed by using the finite element model, so as to verify whether a laying strength of an overall composite material layer is qualified, and in response to the laying strength of the overall composite material layer is qualified, step S4 may be performed.

S4, a finite element fatigue life analysis may be performed on the hydrogen storage tank by using the finite element model, so as to verify whether there is a site susceptible to fatigue failure on the hydrogen storage tank, and in response to that there is a site susceptible to fatigue failure on the hydrogen storage tank, step S5 may be performed; in response to that there is not a site susceptible to fatigue failure on the hydrogen storage tank, the laying scheme may be directly used as a design result of the hydrogen storage tank laying.

S5, the laying scheme of the composite material layer corresponding to the site susceptible to fatigue failure may be modified, and a total count of winding layers of the hydrogen storage tank as a whole may be maintained during the modification. In some embodiments, the total count of winding layers may be a sum of the count of hoop layers and the count of helical layers.

S6, returning to step S2 to perform a strength verification and a fatigue verification on a modified laying scheme, whether to continue the modification may be determined based on the verification results, and the design of the laying of the hydrogen storage tank may be completed when the two verification results of the laying scheme are qualified.

In some embodiments, based on the production control method for hydrogen storage tank described above, a specific model of the hydrogen storage tank may be used as an example for a laying design and a trial production experiment for a particular model of the hydrogen storage tank, which are carried out in the following process, i.e., (1) to (6).

(1) The shape of the liner of the hydrogen storage tank may be determined, and the thickness of the composite material layer may be estimated, and a preliminary design of the layer count may be made according to the liner size and the design pressure.

An overall strength design of a Type IV carbon fiber fully wound hydrogen storage tank may be carried out by taking into full consideration of the way of laying the composite material layers of the hydrogen storage tank, an opening structure of the hydrogen storage tank, a geometrical feature of a dome part, and a selection of the liner material, and combining micromechanical features of the composite material. A strength calculation of the Type IV hydrogen storage tank, as a basis of a structural design, may be an important reference for overall optimization.

Figure 6:
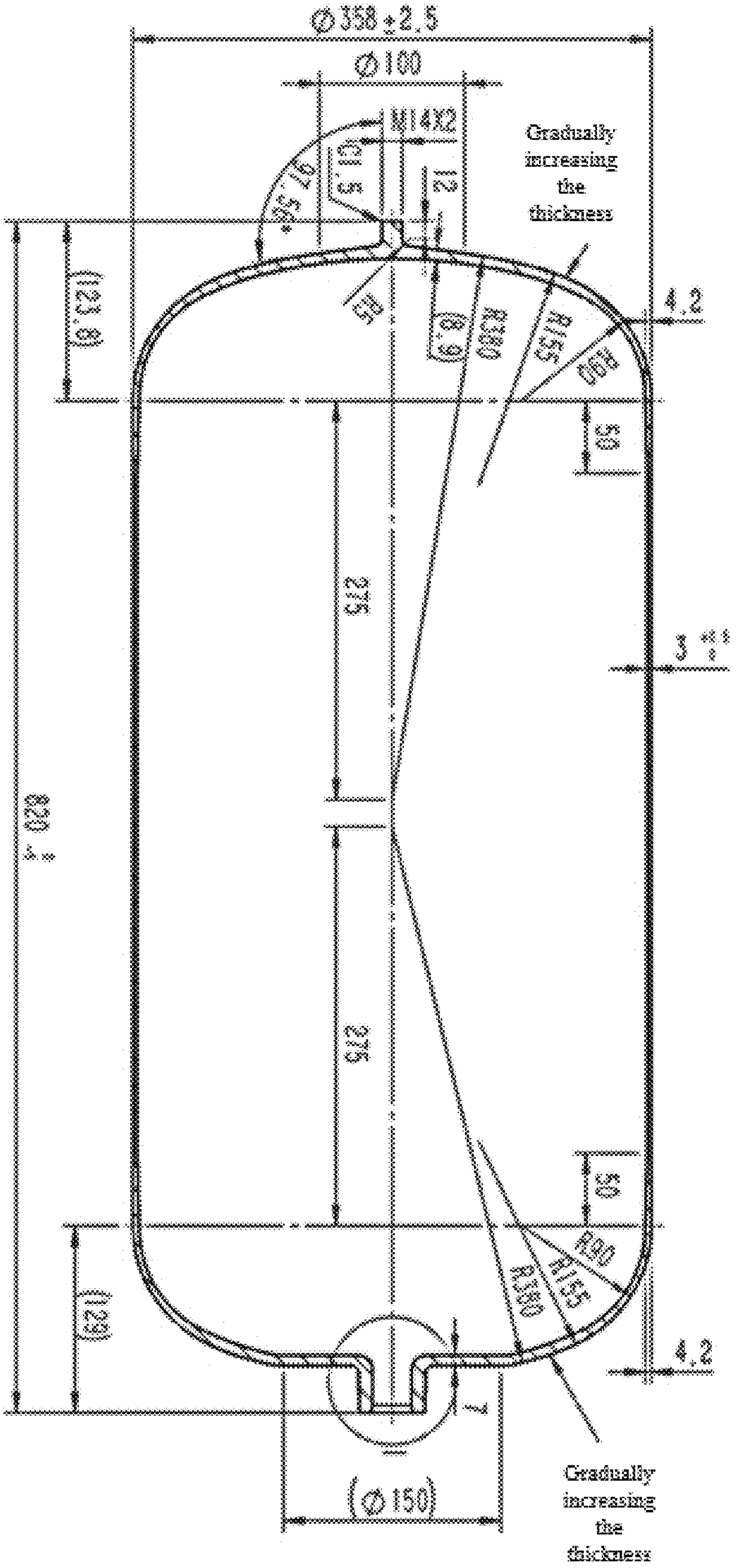
FIG. 6 is a schematic diagram illustrating a size of a hydrogen storage tank according to some embodiments of the present disclosure.

FIG. 6 is a schematic diagram illustrating a size of a hydrogen storage tank according to some embodiments of the present disclosure. As shown in FIG. 6, an inner diameter dimension of the liner of a Type IV hydrogen storage tank may be about 360 mm and a length may be about 820 mm.

A fiber winding layer used in this model of the hydrogen storage tank may be a T700/Epoxy composite. Mechanical properties of the T700 composite are shown in Table 1.

TABLE 1

Mechanical property parameters of the T700 composites

| name | value | unit |
|---|---|---|
| 1-directional Young's modulus | 136 | GPa |
| 2-directional Young's modulus | 8 | GPa |
| 3-directional Young's modulus | 8 | GPa |
| 12-surface shear modulus | 4 | GPa |
| 23-surface shear modulus | 3 | GPa |
| 13-surface shear modulus | 4 | GPa |
| 12-surface Poisson's ratio | 0.3 | |
| 23-surface Poisson's ratio | 0.4 | |
| 13-surface Poisson's ratio | 0.3 | |
| density | 1550 | $Kg/m^3$ |
| fiber yarn width | 4.7/5 | mm |
| single layer thickness of helical layer | 0.325 | mm |
| single layer thickness of hoop layer | 0.306 | mm |

Strength parameters of the T700 composite are shown in Table 2.

TABLE 2

Strength parameters of the T700 composites

| material strength | strength parameters (MPa) |
|---|---|
| X-direction tensile strength (hoop direction) | 2000 |
| X-direction tensile strength (helical direction) | 2000 |
| X-direction compression strength | 1250 |
| Y-direction tensile strength | 73 |
| Y-direction compression strength | 160 |
| Z-direction tensile strength | 73 |
| Z-direction compression strength | 160 |
| XY face shear strength | 65 |
| YZ face shear strength | 87.8 |
| ZX surface shear strength | 87.8 |
| Maximum strain in the fiber direction | 0.02 |

A head position may take into account an angle change of the composite winding layer as well as a thickness change, and the hoop layer may only be carried out in a tank section.

As a winding process with a plurality of reaming is performed, the final winding thickness may be obtained by adding up the thicknesses of several reaming. According to the experimental measurement, a single layer thickness ta of the helical layer may be 0.376 mm, and a single layer thickness the of the hoop layer may be 0.332 mm, and fiber thicknesses of the helical layer and the hoop layer of the tank section under a designed burst pressure may respectively be:

$$t_{f\alpha} = K\frac{RP_b}{2\delta\sigma_b\cos^2\alpha_0}$$

$$t_{f\theta} = \frac{RP_b}{2\sigma_b}\left(2 - \tan^2\alpha_0\right)$$

The parameters in the formula have been defined in the previous steps of the method and are not repeated here. Based on each of the above parameters, the fiber thickness $t_{f\alpha}$=11.270 mm for helical winding and the fiber thickness $t_{f\theta}$=11.951 mm for hoop winding may be calculated.

The count of helical layers and the count of hoop layers may be calculated based on the single layer thickness of the helical composite material and the single layer thickness of the hoop composite material, which are $$n\alpha = \frac{t_{f\alpha}}{t\alpha} = 29.973, \text{ and}$$

$$n\alpha = \frac{t_{f\alpha}}{t\alpha} = 35.997,$$

respectively. The fiber winding may generally be a cross double layer. According to the calculation in the previous section, under a premise of ensuring to meet the requirements of a mesh theory, it may be finally determined that the preliminary laying scheme for a lower IV type high-pressure hydrogen storage tank may be as follows: 36 layers of the hoop layer, with a total thickness of 11.952 mm; 32 layers of the helical layer, with a total thickness of 12.032 mm. The laying sequence of the hydrogen storage tank is shown in Table 3.

TABLE 3

The laying scheme of the composite material layer

| Serial No. | Fiber and winding site | Left winding angle (degrees) | Right winding angle (degrees) | Winding layer count |
|---|---|---|---|---|
| 1 | Carbon Fiber, Helical Winding | ±11.2 | ±6.6 | 2 |
| 2 | Carbon Fiber, Hoop Winding | | | 12 |
| 3 | Carbon Fiber, Helical Winding | ±11.2 | ±6.6 | 4 |
| 4 | Carbon Fiber, Hoop Winding | | | 8 |
| 5 | Carbon Fiber, Helical Winding | ±12.8 | ±12.8 | 2 |
| 6 | Carbon Fiber, Helical Winding | ±15.6 | ±15.6 | 2 |
| 7 | Carbon Fiber, Hoop Winding | | | 8 |
| 8 | Carbon Fiber, Helical Winding | ±20.5 | ±20.5 | 2 |
| 9 | Carbon Fiber, Helical Winding | ±23.5 | ±23.5 | 2 |
| 10 | Carbon Fiber, Helical Winding | ±26.5 | ±26.5 | 2 |
| 11 | Carbon Fiber, Helical Winding | ±33.4 | ±33.4 | 2 |
| 12 | Carbon Fiber, Helical Winding | ±37.4 | ±37.4 | 2 |
| 13 | Carbon Fiber, Helical Winding | ±42.3 | ±42.3 | 2 |
| 14 | Carbon Fiber, Helical Winding | ±11.2 | ±6.6 | 2 |
| 15 | Carbon Fiber, Hoop Winding | | | 6 |
| 16 | Carbon Fiber, Helical Winding | ±20.5 | ±20.5 | 2 |
| 17 | Carbon Fiber, Helical Winding | ±23.5 | ±23.5 | 2 |
| 18 | Carbon Fiber, Helical Winding | ±26.5 | ±26.5 | 2 |
| 19 | Carbon Fiber, Helical Winding | ±11.2 | ±6.6 | 2 |
| 20 | Carbon Fiber, Hoop Winding | | | 2 |
| | Total | | | 68 |

(2). The finite element model may be established to calculate the laying strength of the composite material layer.

Figure 7:
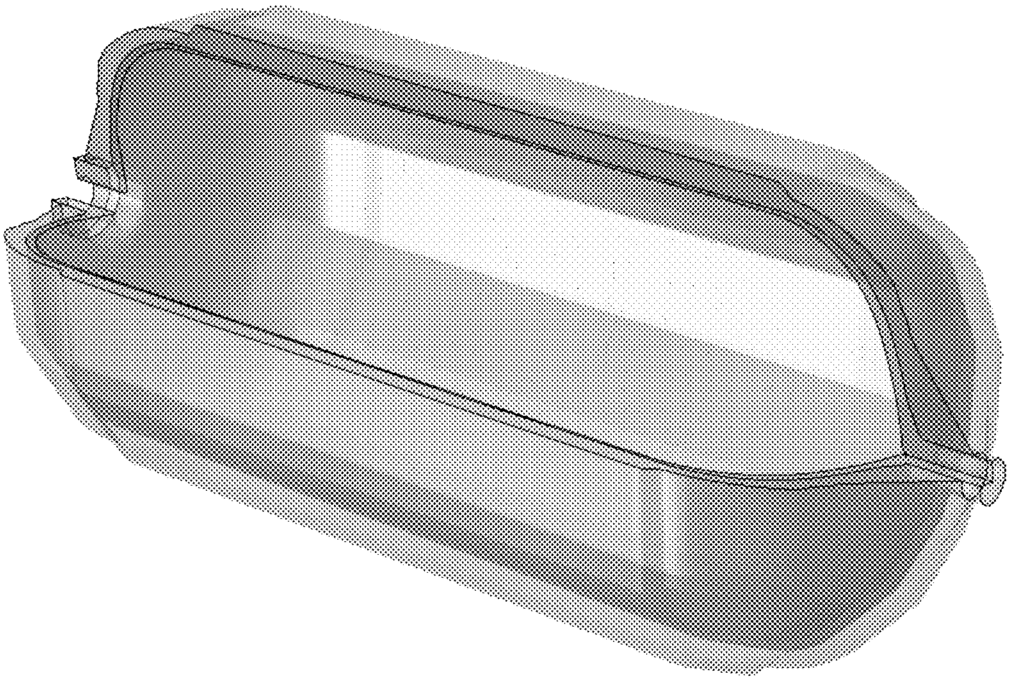
FIG. 7 is a diagram illustrating a finite element model of a hydrogen storage tank established based on a composite material layer according to some embodiments of the present disclosure.

FIG. 7 is a diagram illustrating a finite element model of a hydrogen storage tank established based on a composite material layer according to some embodiments of the present disclosure. As shown in FIG. 7, according to a laying scheme and dimensions of each component in the above steps, after considering an ultimate load-bearing condition under a bursting pressure, a finite element model of a plastic liner as well as metal parts at two end joints may be established according to actual dimensions, and a preliminary strength counting of the laying scheme of the composite material layer may be verified by mesh theory.

With a gradual increase of an internal pressure, a hydrogen storage tank may undergo a bursting failure, and results of finite element calculations may be used to verify that a structural strength of the composite material and an opening of the tank meets requirements of the bursting pressure.

Figure 8:
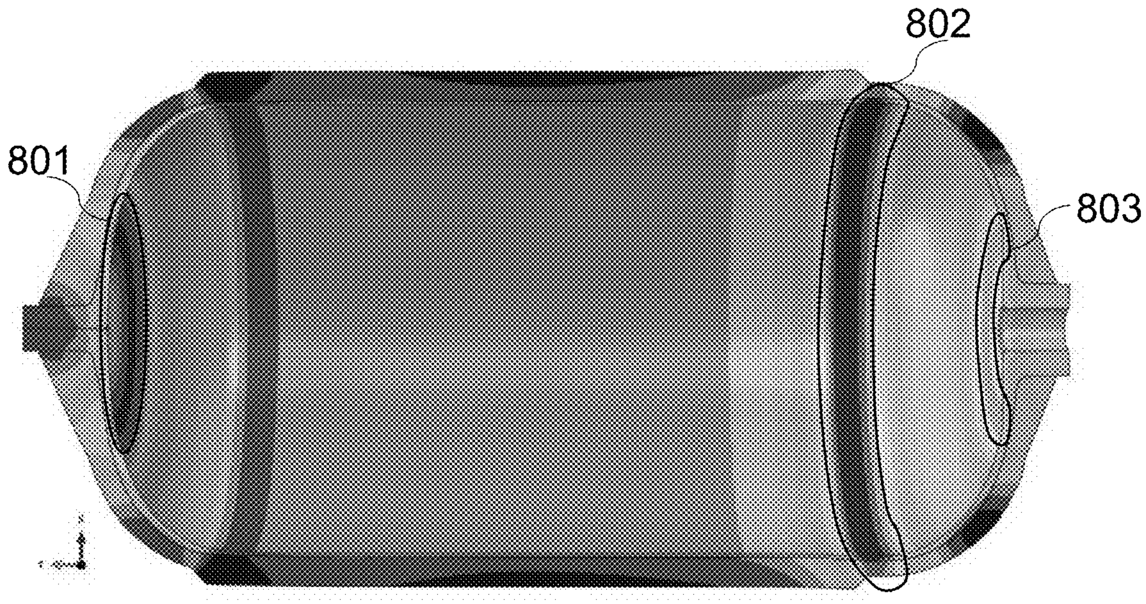
FIG. 8 is a cloud diagram illustrating a deformation when performing a finite element bearing strength analysis on a hydrogen storage tank according to some embodiments of the present disclosure.
Figure 9:
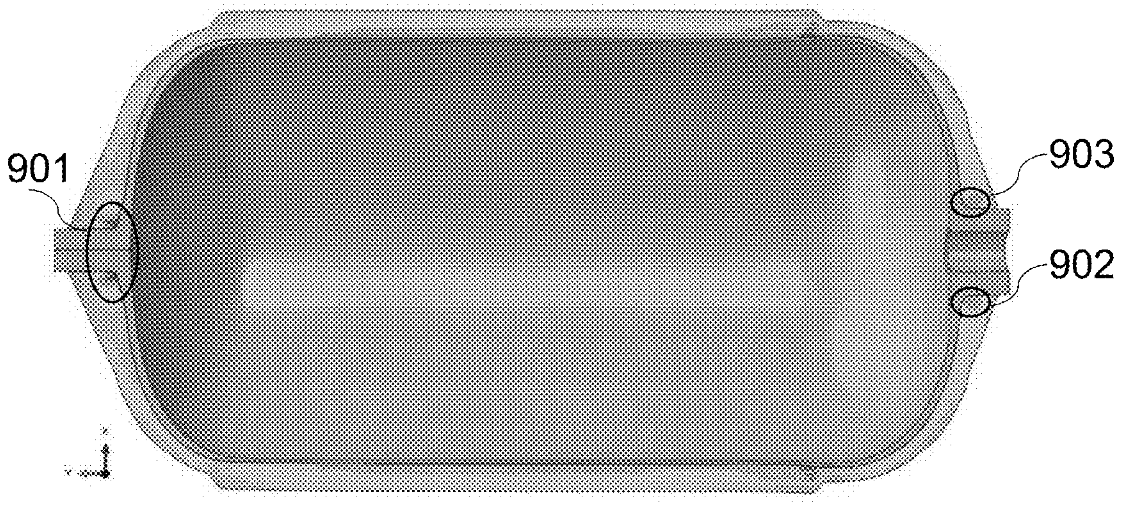
FIG. 9 is a diagram illustrating a stress distribution when performing a finite element bearing strength analysis on a hydrogen storage tank according to some embodiments of the present disclosure.

FIG. 8 is a cloud diagram illustrating a deformation when performing a finite element bearing strength analysis on a hydrogen storage tank according to some embodiments of the present disclosure; and FIG. 9 is a diagram illustrating a stress distribution when performing a finite element bearing strength analysis of a hydrogen storage tank according to some embodiments of the present disclosure. FIG. 8 is a deformation cloud diagram of the finite element model of FIG. 7 during bursting, showing displacement or deformation of various portions of the hydrogen storage tank under a preset internal pressure, with different colors indicating different degrees of deformation, the darker the color, the greater the deformation. Exemplary, 801-803 are regions with relatively great deformation. "U" refers to a displacement value of a point or a region in the finite element model, and "Magnitude" refers to the magnitude of the displacement value. FIG. 9 is a carbon fiber failure cloud diagram when the finite element model is bursting. The carbon fiber failure cloud shows a stress distribution of the hydrogen storage tank under a preset internal pressure, and the different colors are used to indicate the stresses in different regions. The darker the color, the higher the stress. Exemplarily, 901-903 are the regions with relatively high stresses. According to the composite storage tank designed in the previous steps, the simulation result in the internal pressure of 157.5 MPa did not occur under the bursting failure, and the bursting failure occurred until the tank is under the pressure of 166 MPa, then the calculation stops to meet the 157.5 MPa design burst pressure. It may be noted that the burst pressure here is the result of the test, and a qualified burst pressure for the design may be 2.25 times of the working pressure, i.e., 70×2.25=157.5 MPa.

Based on the results of FIG. 8 and FIG. 9, it may be seen that the current laying scheme satisfies the pressure bearing requirements.

(3). The fatigue strength of the opening structure of the tank may be calculated according to a complete storage tank model and taking into account the strength of the composite material layer.

The failure of the composite material layer of the hydrogen storage tank may often be due to an exceeding of an ultimate load, which leads to a sudden damage. Based on a great count of experiments, it may be seen that a main damage manner under fatigue loading is the deformation damage of the a variety of materials at the complex sealing structure at the opening of the tank. Based on the same finite element model, the fatigue life of a plastic liner of the composite storage tank may be predicted for the weak position. The fatigue loading may be set to increase from 2 MPa to 87.5 MPa, then decrease to 2 MPa, etc.

Figure 10:
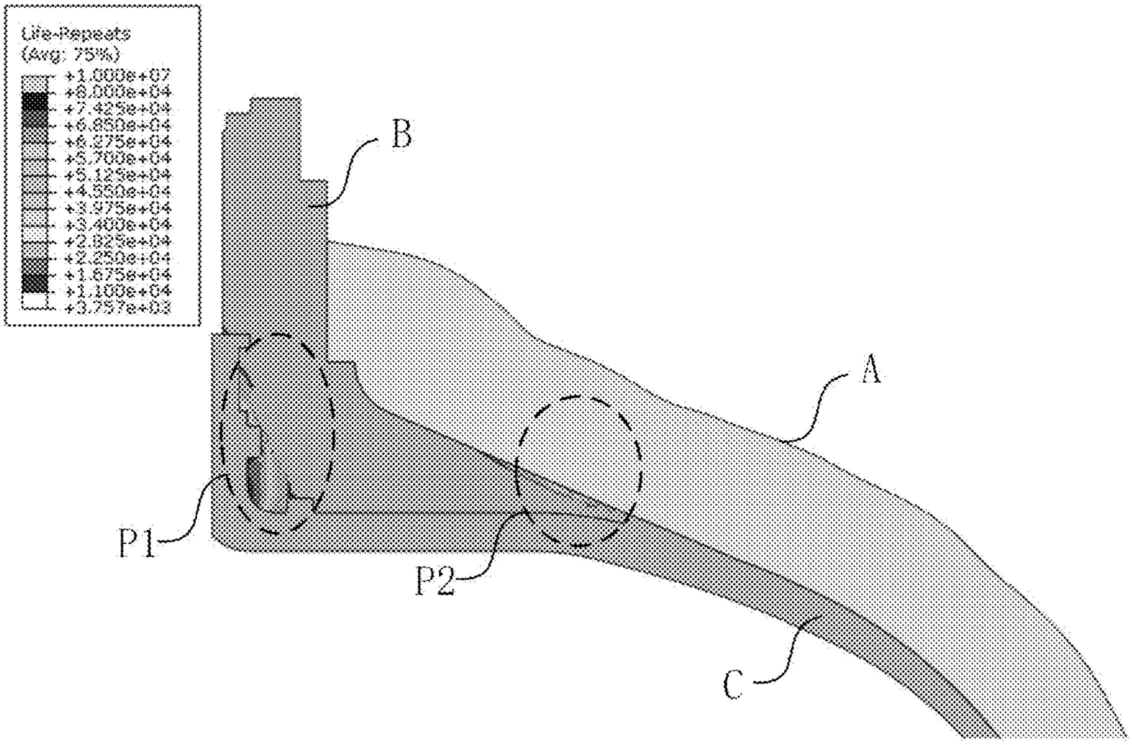
FIG. 10 is a schematic diagram illustrating a fatigue failure site at an opening of a hydrogen storage tank when performing a finite element fatigue life analysis of the hydrogen storage tank according to some embodiments of the present disclosure.
Figure 11:
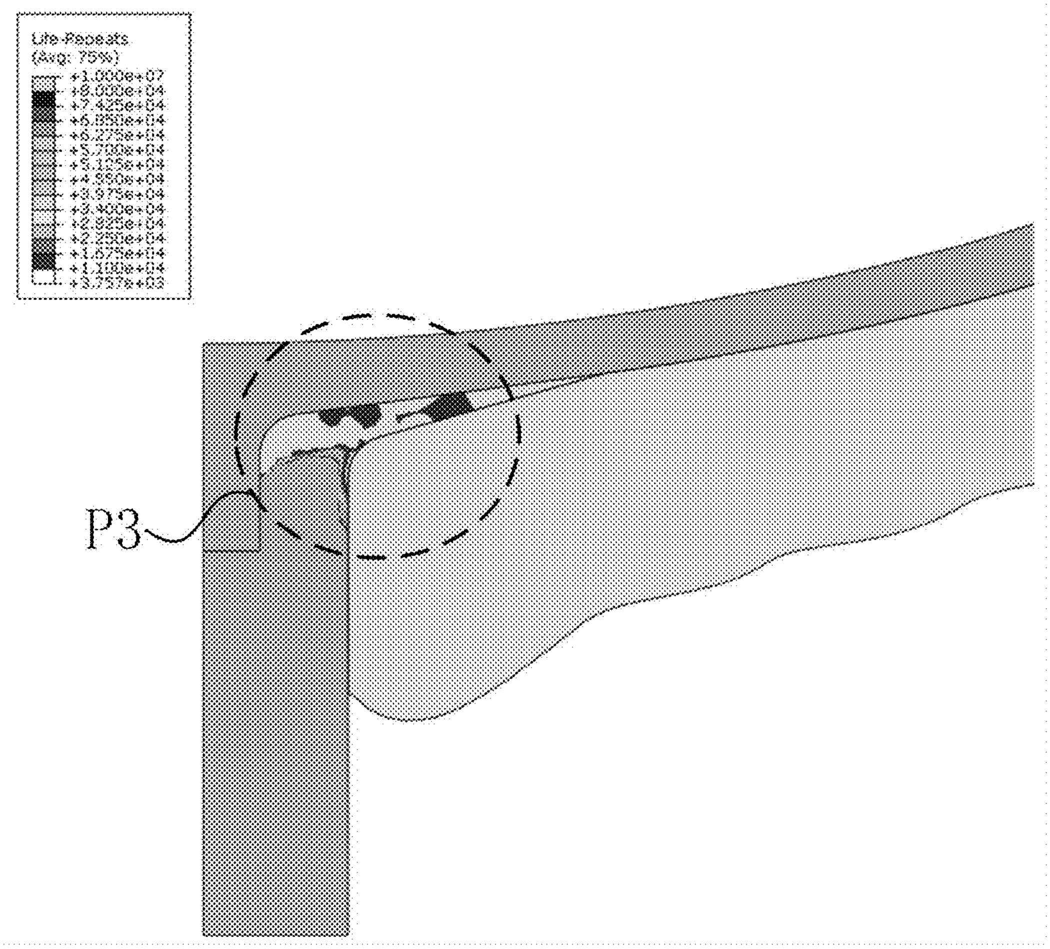
FIG. 11 is a schematic diagram illustrating a fatigue failure site at an end of a hydrogen storage tank when performing a finite element fatigue life analysis on the hydrogen storage tank according to some embodiments of the present disclosure.

FIG. 10 is a schematic diagram illustrating a fatigue failure site at an opening of a hydrogen storage tank when performing a finite element fatigue life analysis of the hydrogen storage tank according to some embodiments of the present disclosure; and FIG. 11 is a schematic diagram illustrating a fatigue failure site at an end of a hydrogen storage tank when performing a finite element fatigue life analysis on the hydrogen storage tank according to some embodiments of the present disclosure. As shown in FIG. 10 and FIGS. 11, A, B, and C in FIG. 10 and FIG. 11 indicate a composite material, a metal joint, and a plastic liner, respectively; P1 indicates a fatigue damage for 8,000 times (metal joints), P2 indicates the fatigue damage for 15,000 times (metal joints), and no obvious damage is shown on the plastic liner; and P3 indicates the fatigue damage for 10,000 times (storage tank tail top). As may be seen from the results of the calculations, the fatigue performance of the tank under this scheme does not meet the requirements.

(4). The laying scheme may be adjusted according to the calculation results.

According to the above calculation result, the layer that covers both ends with a small angle in the layer scheme may be adjusted. According to the composite material layer thickness calculation formula in step 1, the count of layers with left winding angle of 11.2 degrees and 12.8 degrees may be adjusted, specifically, the adjustment manner is as follows.

First, according to the fatigue failure site, the relevant laying angle may be calculated according to the formula, α=ar csi $$n\frac{r_0}{R},$$

where, R denotes an outer surface radius of a liner tank section, $r_0$ denotes a radius of a pole hole, and a denotes the winding angle. Each of the three parts in FIG. 10 and FIG. 11 corresponds to the position of the pole hole of the composite material layer laying with left winding angles of 11.2 degrees, 15.6 degrees, and a right winding angle of 6.6 degrees, respectively.

For the laying layer where an undercut is required, the thickness of the laying at that position may be adjusted. Therefore, the count of layers of the composite material with the left winding angle of 11.2 degrees and the right winding angle of 6.6 degrees may be adjusted to 4 layers, 6 layers, and 4 layers (Serial No. 1, 3 and 19).

For the other winding layers, the laying angle at this position may be modified so that the fibers is able to better cover the site susceptible to fatigue failure, and therefore the 15.6 degree laying angle may be adjusted to 13.6 degrees (Serial No. 6).

After the modification, the new laying scheme is shown in Table 4 below, with the total count of winding layers and total thickness remaining the same.

TABLE 4

New laying scheme for composite material layers

| Serial No. | Fiber and winding area | Left winding angle (degrees) | Right winding angle (degrees) | Winding layer count |
|---|---|---|---|---|
| 1 | Carbon Fiber, Helical Winding | ±11.2 | ±6.6 | 4 |
| 2 | Carbon Fiber, Hoop Winding | | | 12 |
| 3 | Carbon Fiber, Helical Winding | ±11.2 | ±6.6 | 6 |
| 4 | Carbon Fiber, Hoop Winding | | | 8 |
| 5 | Carbon Fiber, Helical Winding | ±12.8 | ±12.8 | 0 |
| 6 | Carbon Fiber, Helical Winding | ±13.6 | ±13.6 | 2 |
| 7 | Carbon Fiber, Hoop Winding | | | 8 |
| 8 | Carbon Fiber, Helical Winding | ±20.5 | ±20.5 | 0 |
| 9 | Carbon Fiber, Helical Winding | ±23.5 | ±23.5 | 2 |
| 10 | Carbon Fiber, Helical Winding | ±26.5 | ±26.5 | 2 |
| 11 | Carbon Fiber, Helical Winding | ±33.4 | ±33.4 | 2 |
| 12 | Carbon Fiber, Helical Winding | ±37.4 | ±37.4 | 2 |
| 13 | Carbon Fiber, Helical Winding | ±42.3 | ±42.3 | 2 |
| 14 | Carbon Fiber, Helical Winding | ±11.2 | ±6.6 | 2 |
| 15 | Carbon Fiber, Hoop Winding | | | 6 |
| 16 | Carbon Fiber, Helical Winding | ±20.5 | ±20.5 | 0 |
| 17 | Carbon Fiber, Helical Winding | ±23.5 | ±23.5 | 2 |
| 18 | Carbon Fiber, Helical Winding | ±26.5 | ±26.5 | 2 |
| 19 | Carbon Fiber, Helical Winding | ±11.2 | ±6.6 | 4 |
| 20 | Carbon Fiber, Hoop Winding | | | 2 |
| | Total | | | 68 |

(5) A fatigue strength and an overall strength may be reverified, and a trial production of tanks may be performed after the requirements are satisfied.

Figure 12:
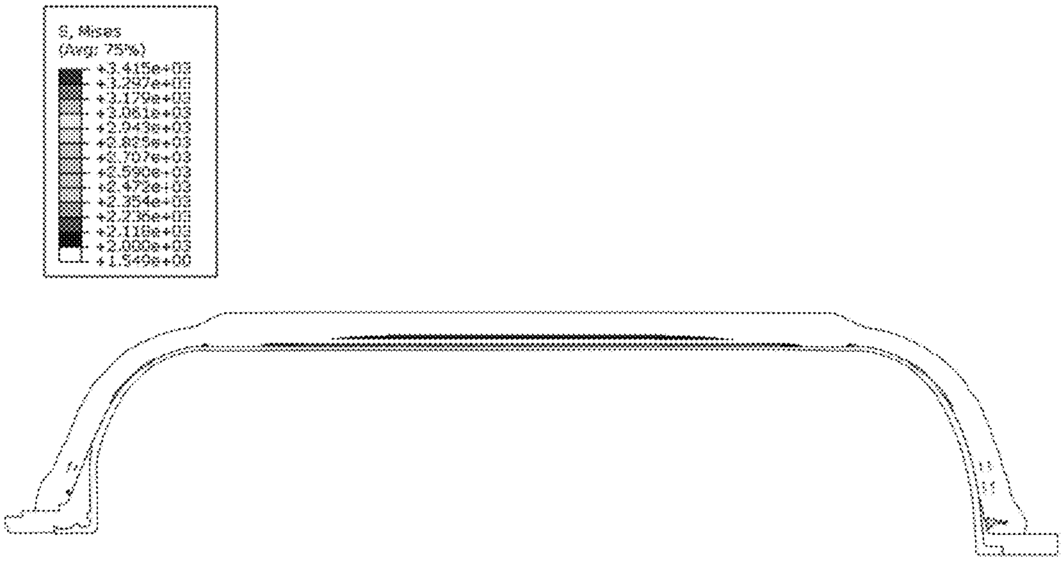
FIG. 12 is a schematic diagram illustrating a simulation result of recalibrating a layer strength according to some embodiments of the present disclosure.

FIG. 12 is a schematic diagram illustrating a simulation result of recalibrating a layer strength according to some embodiments of the present disclosure. A strength may be recalculated, as shown in FIG. 12, with Mises as an equivalent stress. After a preliminary laying scheme design, a finite element analysis, a paving strength assessment, a fatigue life assessment, and a modification on the laying scheme of the easy fatigue failure site, a finite element simulation may be reperformed on the modified laying scheme to verify whether the modified laying scheme satisfies design requirements, and it may be seen that a bursting strength still satisfies the design requirements.

The fatigue life may be recalculated, and compared with the previous results, as shown in Table 5.

TABLE 5

Comparison of fatigue life before and after optimization

| | P1 site | P2 site | P3 site | Total |
|---|---|---|---|---|
| pre-optimization | 8000 | 15000 | 10000 | Failure to meet requirements |
| post-optimization | 12000 | 26000 | 11000 | Fulfillment |

This result shows a significant improvement in fatigue strength.

(6). A fatigue test, a bursting test, and a hydraulic test, etc., may be performed to determine the reasonableness of the design of the laying scheme, and the design of the hydrogen storage tank may be completed.

The hydraulic test, an airtightness test, a fatigue test, and a bursting test may be performed on the hydrogen storage tan with the composite material layer, and a performance of the product may be evaluated based on the test result.

Finally, according to the optimization result, a sample tank may be produced, and a comparative experiment may be performed on the sample tank. A result of the experiment shows that the count of fatigue cycles of the hydrogen storage tank is successfully improved, and a designed operation pressure satisfies design requirements for the 70 MPa type IV hydrogen storage tank. Other test results may not be repeated here.

The basic concepts have been described above, and it is apparent to those skilled in the art that the foregoing detailed disclosure serves only as an example and does not constitute a limitation of the present disclosure. While not expressly stated herein, those skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the specification, such as "an embodiment," "an embodiment," and/or "some embodiments" means a feature, structure, or characteristic associated with at least one embodiment of the present disclosure. Accordingly, it should be emphasized and noted that "one embodiment" or "an embodiment" or "an alternative embodiment" in different locations in the present disclosure do not necessarily refer to the same embodiment. In addition, certain features, structures, or characteristics of one or more embodiments of the present disclosure may be suitably combined.

Furthermore, unless expressly stated in the claims, the order of the processing elements and sequences, the use of numerical letters, or the use of other names as described in the present disclosure are not intended to qualify the order of the processes and methods of the present disclosure. While some embodiments of the present disclosure that are currently considered useful are discussed in the foregoing disclosure by way of various examples, it should be appreciated that such details serve only illustrative purposes, and that additional claims are not limited to the disclosed embodiments!, rather, the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that to simplify the presentation of the present disclosure, and thereby aid in the understanding of one or more embodiments of the invention, the foregoing descriptions of embodiments of the specification sometimes group multiple features together in a single embodiment, accompanying drawings, or in a description thereof. description thereof. However, this method of disclosure does not imply that more features are required for the objects of the present disclosure than are mentioned in the claims. Rather, claimed subject matter may lie in less than all features of a single foregoing disclosed embodiment.

Some embodiments use counts describing the count of components, attributes, and it should be understood that such counts used in the description of embodiments are modified in some examples by the modifiers "approximately," "nearly," or "substantially," "approximately." Unless otherwise noted, the terms "approximately," "nearly," or "substantially" indicates that a ±20% variation in the stated count is allowed. Correspondingly, in some embodiments, the numerical parameters used in the specification and claims are approximations, which may change depending on the desired characteristics of the individual embodiment. In some embodiments, the numerical parameters should take into account the specified count of valid digits and employ general place-keeping. While the numerical domains and parameters used to confirm the breadth of their ranges in some embodiments of the present disclosure are approximations, in specific embodiments such values are set to be as precise as possible within a feasible range.

For each of the patents, patent applications, patent application disclosures, and other materials cited in the present disclosure, such as articles, books, specification sheets, publications, documents, etc., are hereby incorporated by reference in their entirety into the present disclosure. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be considered to be consistent with the teachings of the present disclosure as an example, not as a limitation. Correspondingly, the embodiments of the present disclosure are not limited to the embodiments expressly presented and described herein.

What is claimed is:

1. A production control system for a hydrogen storage tank, including: an operating unit, a design terminal, and a processor, the processor being communicatively connected to the operating unit and the design terminal, respectively, wherein the operating unit includes a feeding component and a winding mechanism, and the feeding component is configured to deliver a composite material layer on a production line; the winding mechanism is configured to wind the composite material layer around a liner on the production line in accordance with a target laying parameter to form inner and outer walls of the hydrogen storage tank;

the design terminal is configured to operate a finite element simulation command stored in a storage unit, the finite element simulation command is configured to perform a plurality of rounds of iterations, each of the plurality of rounds of iterations at least includes one finite element simulation, and the design terminal is further configured to obtain the target laying parameter based on a result of the finite element simulation obtained from the plurality of rounds of iterations; wherein the each of the plurality of rounds of iterations includes:

determining a liner size of the hydrogen storage tank, and determining a laying scheme for the composite material layer based on the liner size;

establishing a finite element model of the hydrogen storage tank based on the laying scheme;

determining whether a laying strength of the composite material layer is qualified by performing a strength verification on the hydrogen storage tank using the finite element model;

in response to a determination that the laying strength of the composite material layer is qualified, determining whether the hydrogen storage tank has a fatigue failure site by performing a fatigue verification on the hydrogen storage tank using the finite element model:

in response to a determination that the hydrogen storage tank does not have the fatigue failure site, determining the target laying parameter based on the laying scheme;

in response to a determination that the hydrogen storage tank has the fatigue failure site, performing a modification on the laying scheme corresponding to the fatigue failure site;

performing the strength verification and the fatigue verification on a modified laying scheme, and determining whether to continue the modification based on a verification result; and in response to a determination that the verification result satisfies a preset condition, determining the target laying parameter based on the modified laying scheme;

the processor is configured to:

obtain the target laying parameter from the design terminal, generate an operation command based on the target laying parameter, and send the operation command to the winding mechanism; and determine whether to generate an optimization command, and in response to a determination of generating the optimization command, generate the optimization command and send the optimization command to at least one of the operating unit, and the design terminal.

2. The system of claim 1, wherein the processor is further configured to:

obtain a mechanical property parameter and a strength parameter of a composite material of the composite material layer;

determine a target winding parameter based on the mechanical property parameter, the strength parameter, the liner size, and the target laying parameter, the target winding parameter including a target winding tension distribution and a target winding speed distribution; and generate the operation command based on the target winding parameter and the target laying parameter, and send the operation command to the winding mechanism.

3. The system of claim 2, wherein the processor is further configured to:

generate a plurality of groups of candidate winding parameters, each group of the candidate winding parameters including a candidate winding tension distribution and a candidate winding speed distribution;

predict an estimated winding effect corresponding to each group of the candidate winding parameters through an effect prediction model, the effect prediction model being a machine learning model; and determine the target winding parameter based on the estimated winding effect corresponding to each group of the candidate winding parameters.

4. The system of claim 3, wherein an input to the effect prediction model includes an internal pressure value at a moment of burst failure corresponding to the target laying parameter and a cycle count corresponding to a moment when a fatigue damage occurs in a plurality of rounds of finite element simulation.

5. The system of claim 3, wherein the processor is further configured to:

perform a plurality of rounds of iterative training on the effect prediction model, wherein each round of the iterative training includes:

updating a network parameter of the effect prediction model based on a sample prediction value and a sample true value selected for a current round of iteration, and a learning rate of the current round of iteration; wherein the learning rate of each round of iteration is related to a sample outlier selected for the round of iteration, and the sample outlier is determined based on a sample internal pressure value and a sample cycle count.

6. The system of claim 1, wherein a total count of winding layers of the hydrogen storage tank is maintained unchanged when the laying scheme is modified; and the design terminal is further configured to:

in response to a determination that the fatigue failure site is a first region of the hydrogen storage tank, adding a preset count of helical layers to the fatigue failure site; and reducing the preset count of helical layers in an adjacent site; and in response to a determination that the fatigue failure site is a second region of the hydrogen storage tank, adjusting a helical winding angle of the fatigue failure site.

7. The system of claim 6, wherein the design terminal is further configured to:

in response to a determination that a count of modifications of the laying scheme satisfies a first condition, and the verification result does not satisfy the preset condition, mark an unqualified site of the hydrogen storage tank based on a last modified laying scheme; and generate a reinforcement process command based on the unqualified site; the reinforcement process command including increasing the total count of winding layer s of the hydrogen storage tank.

8. The system of claim 1, wherein the laying scheme includes at least one of a count of hoop layers, a count of helical layers, and a helical winding angle; and the design terminal is further configured to:

obtain a single layer thickness of the helical layers and a single layer thickness of the hoop layers;

determine a fiber thickness of helical winding and a fiber thickness of hoop winding;

determine the count of hoop layers based on the fiber thickness of the hoop winding and the single layer thickness of the hoop layers; and determine the count of helical layers based on the fiber thickness of the helical winding and the single layer thickness of the helical layers.

9. The system of claim 8, wherein the design terminal is further configured to:

determine the fiber thickness of the helical winding and the fiber thickness of the hoop winding based on an outer surface radius of a liner tank section, a designed burst pressure, a tensile strength of a composite material, and a winding angle.

10. The system of claim 1, wherein the design terminal is further configured to:

record an internal pressure value at a moment of burst failure of the hydrogen storage tank by continuously increasing an internal pressure of the hydrogen storage tank when performing the strength verification on the hydrogen storage tank; and determine that the laying strength of the composite material layer is qualified when the internal pressure value satisfies a second condition, or determine that the laying strength of the composite material layer is unqualified when the internal pressure value does not satisfy the second condition.

11. The system of claim 10, wherein the second condition includes the internal pressure value being greater than a burst pressure threshold, the burst pressure threshold being not less than 157.5 MPa.

12. The system of claim 1, wherein the design terminal is further configured to:

record a performance of the hydrogen storage tank during a cyclic loading at a preset pressure interval and a cycle count corresponding to a moment when a fatigue damage occurs in the hydrogen storage tank when performing the fatigue verification on the hydrogen storage tank; and when the cycle count satisfies a third condition, determine that a site in which the fatigue damage occurs belongs to the fatigue failure site, or when the cycle count does not satisfy the third condition, determine that the site is a lifespan qualified site.

13. The system of claim 12, wherein the preset pressure interval is [2 MPa, 87.5 MPa].

14. The system of claim 1, further comprising a user terminal and a monitoring unit communicatively connected to the processor, respectively, wherein the monitoring unit includes an imaging component arranged on the production line, the imaging component is configured to: obtain image data during a process of winding the composite material layer around the liner, the optimization command including a first optimization command and a second optimization command, and the processor is further configured to:

calculate a defective product rate and a winding defect rate every preset length of time based on image data obtained from the monitoring unit at a plurality of time points and actual measurement data of a finished product obtained from the user terminal;

determine whether to generate the optimization command based on the defective product rate and the winding defect rate;

in response to a determination of generating the optimization command, the processor is configured to:

determine a meshing accuracy of the finite element simulation based on the defective product rate and generate the first optimization command, and send the first optimization command to the design terminal, the first optimization command being configured to cause the design terminal to rerun the finite element simulation command based on the meshing accuracy to redetermine the target laying parameter; and determine an adjustment parameter and generate the second optimization command based on the winding defect rate, and send the second optimization command to the monitoring unit, the second optimization command being configured to adjust a monitoring parameter of the monitoring unit.

15. The system of claim 14, wherein in the finite element simulation, a preset layer count of helical layers is determined based on a percentage of target fatigue failure sites in actual measurement data, the actual measurement data being obtained from the user terminal.

16. The system of claim 1, wherein the design terminal is further configured to:

in response to a determination that the laying strength of the composite material layer is unqualified, obtain an updated laying scheme by adjusting a winding layer angle through a machine learning model; and perform the strength verification based on the updated laying scheme, in response to a determination that a strength verification result is unqualified, re-adjust the updated laying scheme, and re-perform the strength verification until the laying strength of the composite material layer is qualified.

17. The system of claim 1, further comprising a monitoring unit communicatively connected to the processor, wherein the monitoring unit includes an imaging component disposed on the production line, and the imaging component is configured to obtain image data during a process of winding the composite material layer around the liner; and the processor is further configured to:

determine a position distribution of the fatigue failure site by performing statistics on finite element simulations in historical data; and generate an angle control command based on the position distribution and send the angle control command to the imaging component, the angle control command being configured to adjust an imaging angle of the imaging component on the production line.

* * * * *